(12) United States Patent
Hirano et al.

(10) Patent No.: US 7,373,648 B2
(45) Date of Patent: May 13, 2008

(54) DISK RECORDING AND/OR REPRODUCING DEVICE

(75) Inventors: Kenichi Hirano, Tochigi (JP); Takeshi Suzuki, Tokyo (JP); Shinji Ito, Tokyo (JP); Takeshi Sano, Chiba (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 10/895,804

(22) Filed: Jul. 20, 2004

(65) Prior Publication Data

US 2005/0050561 A1 Mar. 3, 2005

(30) Foreign Application Priority Data

Jul. 22, 2003 (JP) ............................. 2003-277783
Jul. 22, 2003 (JP) ............................. 2003-277785

(51) Int. Cl.
*G11B 33/02* (2006.01)

(52) U.S. Cl. ...................................... 720/608; 720/619

(58) Field of Classification Search ................ 720/619, 720/620, 621, 622, 623, 625, 608; 369/75.2
See application file for complete search history.

(56) References Cited

U.S. PATENT DOCUMENTS

| | | | | |
|---|---|---|---|---|
| 5,255,255 A | * | 10/1993 | Kaneda et al. | 720/621 |
| 6,016,299 A | * | 1/2000 | Ishige | 720/621 |
| 6,137,761 A | * | 10/2000 | Oh et al. | 720/620 |
| 6,411,582 B1 | * | 6/2002 | Nakatani et al. | 720/620 |
| 7,103,894 B2 | * | 9/2006 | Inatani et al. | 720/625 |
| 2003/0193873 A1 | * | 10/2003 | Kagawa | 369/75.2 |

FOREIGN PATENT DOCUMENTS

| | | |
|---|---|---|
| JP | 04-086242 | 7/1992 |
| JP | 04-195854 | 7/1992 |
| JP | 04-263160 | 9/1992 |
| JP | 09-027180 | 1/1997 |
| JP | 2000-260091 | 9/2000 |
| JP | 2003-151193 | 5/2003 |

\* cited by examiner

*Primary Examiner*—Tianjie Chen
(74) *Attorney, Agent, or Firm*—Finnegan, Henderson, Farabow, Garrett & Dunner, L.L.P.

(57) ABSTRACT

A recording and/or reproducing apparatus has a disk transfer mechanism, a mechanical chassis lifting/lowering mechanism, and a gear switching mechanism. The disk transfer mechanism transfers a disk onto a disk table with a motor. The disk transfer mechanism has a rotation transmitting assembly having a gear train including a swing gear and another gear. The mechanical chassis lifting/lowering mechanism lifts and lowers a mechanical chassis with respect to the disk, which is transferred onto the disk table by the disk transfer mechanism. The gear switching mechanism brings the swing gear out of mesh with the other gear of the gear train after the disk is transferred onto the disk table by the disk transfer mechanism, thereby preventing the disk transfer mechanism from being actuated by the motor, and actuating the mechanical chassis lifting/lowering mechanism with the motor. After the disk is transferred onto the disk table by the disk transfer mechanism, the motor having actuated the disk transfer mechanism actuates the mechanical chassis lifting/lowering mechanism.

7 Claims, 31 Drawing Sheets

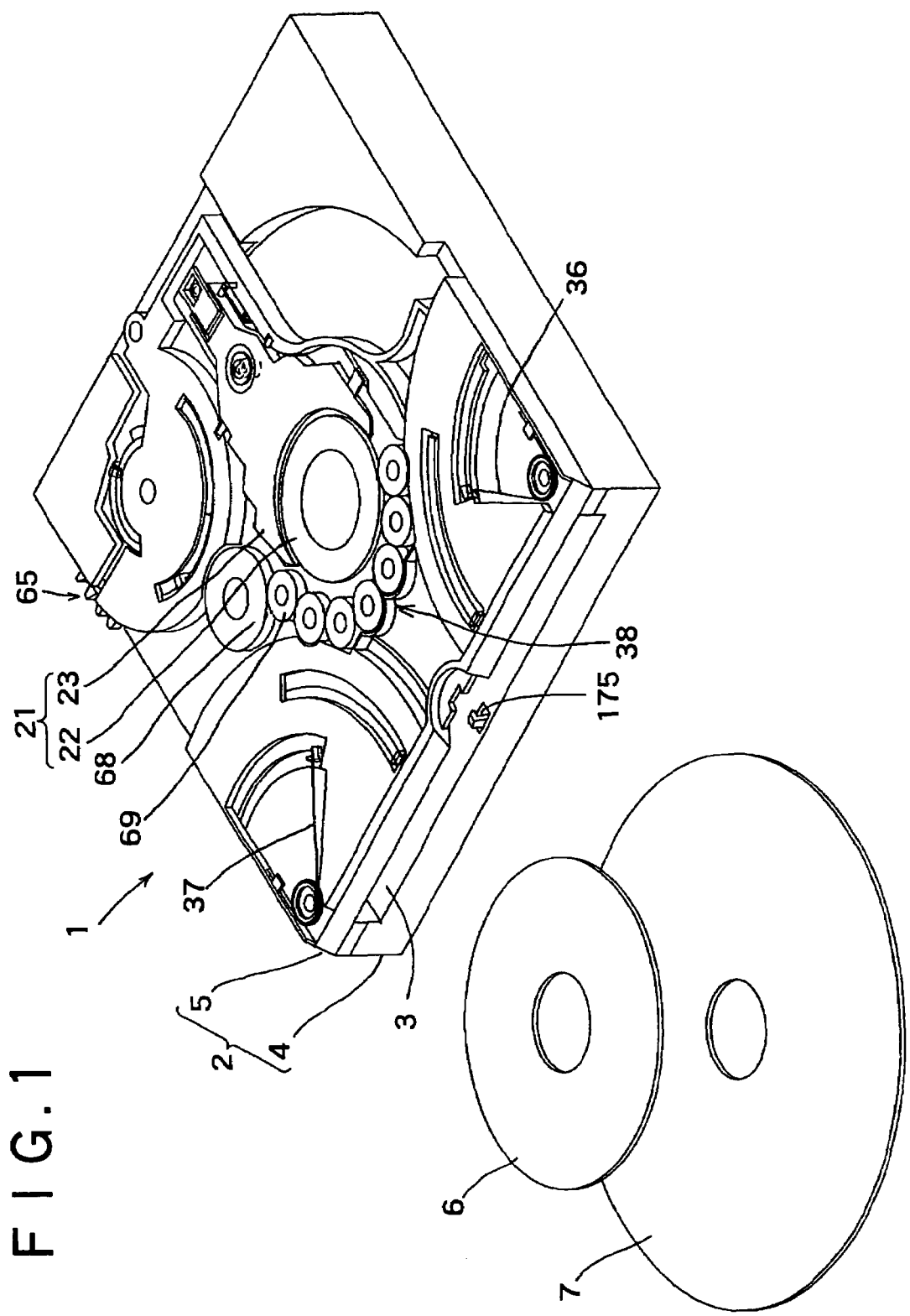

F I G. 1 1
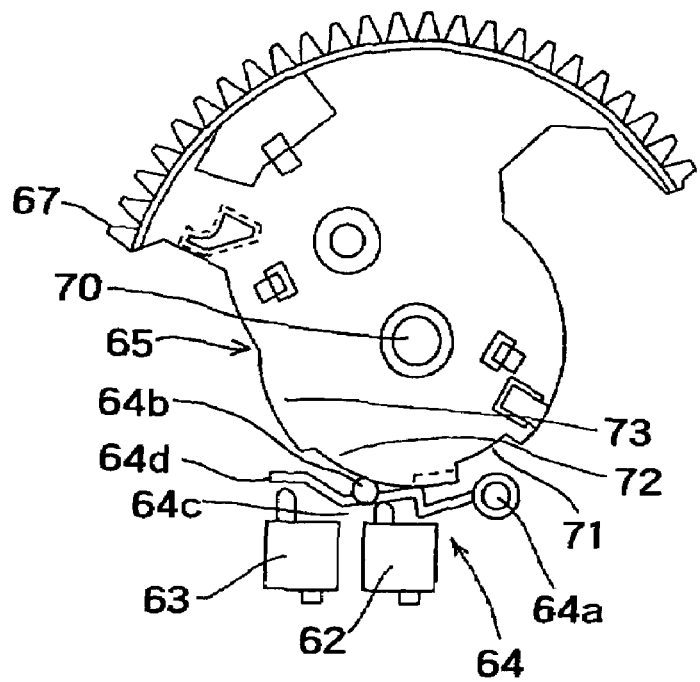
F I G. 1 2
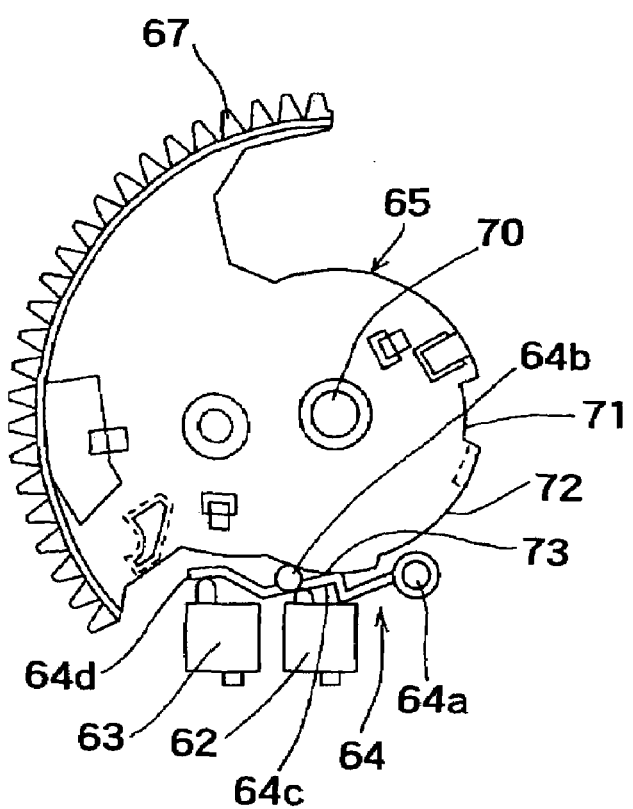

DISK RECORDING AND/OR REPRODUCING DEVICE

BACKGROUND OF THE INVENTION

The present invention relates to a disk recording and/or reproducing device capable of actuating a disk transfer mechanism and a mechanical chassis lifting/lowering mechanism with a single motor.

Disk recording and/or reproducing devices have a disk transfer mechanism for transferring a disk and a mechanical chassis lifting/lowering mechanism for lifting and lowering a mechanical chassis. The mechanical chassis supports a disk table and an optical pickup thereon.

After a disk is transferred onto the disk table by the disk transfer mechanism, the mechanical chassis lifting/lowering mechanism lifts and lowers the mechanical chassis to chuck the disk on the disk table supported on the mechanical chassis. The disk transfer mechanism and the mechanical chassis lifting/lowering mechanism are actuated by respective motors. For details, reference should be made to Japanese Patent Laid-open No. 2003-151193, for example.

The conventional disk recording and/or reproducing device described above is made of up a large number of parts and is costly to manufacture because of the different motors used to actuate the disk transfer mechanism and the mechanical chassis lifting/lowering mechanism, respectively.

SUMMARY OF THE INVENTION

It is an object of the present invention to provide a disk recording and/or reproducing apparatus capable of actuating a disk transfer mechanism and a mechanical chassis lifting/lowering mechanism with a single motor.

According to the present invention, there is provided a recording and/or reproducing apparatus including a disk transfer mechanism for transferring a disk onto a disk table with a motor, the disk transfer mechanism having a rotation transmitting assembly having a gear train including a swing gear and an other gear, a mechanical chassis lifting/lowering mechanism for lifting and lowering a mechanical chassis with respect to the disk, which is transferred onto the disk table by the disk transfer mechanism, and a gear switching mechanism for bringing the swing gear out of mesh with the other gear of the gear train after the disk is transferred onto the disk table by the disk transfer mechanism, thereby preventing the disk transfer mechanism from being actuated by the motor, and actuating the mechanical chassis lifting/lowering mechanism with the motor. After the disk is transferred onto the disk table by the disk transfer mechanism, motor having actuated the disk transfer mechanism actuates the mechanical chassis lifting/lowering mechanism.

In the above recording and/or reproducing apparatus, the gear train includes a pinion gear, the gear switching mechanism having a rack capable of meshing with the pinion gear and having a gear switching member slidable by the rack, the rack having a gear for being pressed and sliding into mesh with the pinion gear, when the disk is transferred onto the disk table by the disk transfer mechanism, the gear switching member having a cam groove for moving the swing gear between a first position in mesh with the other gear and a second position out of mesh with the other gear. When the rack is pressed into mesh with the pinion gear by the disk transferred by the disk transfer mechanism, the rack and the gear switching member slide. The cam groove provided in the gear switching member moves the swing gear from the first position in mesh with the other gear to the second position out of mesh with the other gear.

The above recording and/or reproducing apparatus further includes a gear support member angularly movable about a shaft, the swing gear being mounted on the gear support member, the gear switching member having a boss engaging in the cam groove. When the boss moves in the cam groove, the swing gear is angularly moved about the shaft from the first position in mesh with the other gear to the second position out of mesh with the other gear.

In the above recording and/or reproducing apparatus, the cam groove includes a first groove extending in a sliding direction of the gear switching member for holding the swing gear in the first position, a slanted second groove contiguous to an end of the first groove for moving the swing gear from the first position to the second position, and a third groove contiguous to an end of the second groove and extending in the sliding direction of the gear switching member for holding the swing gear in the second position. When the gear switching member slides, the swing gear is moved from the first position in mesh with the gear train to the second position out of mesh with the gear train while the boss is moving from the first groove through the second groove into the third groove.

According to the present invention, there is also provided a recording and/or reproducing apparatus including a disk insertion guide mechanism having a pair of angularly movable arms supporting respective transfer rollers for contacting an outer circumferential edge of a disk, a disk transfer mechanism for transferring the disk onto a disk table with a motor, the disk transfer mechanism having a rotation transmitting assembly having a gear train including a swing gear and an other gear, a mechanical chassis lifting/lowering mechanism for lifting and lowering a mechanical chassis with respect to the disk, which is transferred onto the disk table by the disk transfer mechanism, and a gear switching mechanism for bringing the swing gear out of mesh with the other gear of the gear train after the disk is transferred onto the disk table by the disk transfer mechanism, thereby preventing the disk transfer mechanism from being actuated by the motor, and actuating the mechanical chassis lifting/lowering mechanism with the motor, the gear switching mechanism having a transfer roller contacting/releasing mechanism actuatable after the mechanical chassis lifting/lowering mechanism is lifted, for displacing the transfer rollers of the disk insertion guide mechanism away from the outer circumferential edge of the disk. The transfer rollers of the disk insertion guide mechanism can be displaced away from the outer circumferential edge of the disk in ganged relation to the gear switching mechanism.

The single motor actuates the disk transfer mechanism and the mechanical chassis lifting/lowering mechanism. Accordingly, the number of motors used and the cost of the apparatus are lower than a conventional apparatus in which the disk transfer mechanism and the mechanical chassis lifting/lowering mechanism are actuated by respective different motors.

The disk transfer mechanism is inactivated after the disk is transferred by the disk transfer mechanism. The motor that has been used to actuate the disk transfer mechanism is then used to actuate the mechanical chassis lifting/lowering mechanism.

When the boss on the swing gear moves in the cam groove provided in the gear switching member, the swing gear is angularly moved about the shaft smoothly from the first position to the second position.

The first groove holds the swing gear in the first position, the second groove moves the swing gear from the first position to the second position, and the third groove holds the swing gear in the second position.

The transfer rollers of the disk insertion guide mechanism are displaced away from the outer circumferential edge of the disk in ganged relation to the gear switching mechanism to make the disk free to rotate.

BRIEF DESCRIPTION OF THE DRAWINGS

These and other objects of the invention will be seen by reference to the description, taken in connection with the accompanying drawing, in which:

FIG. 1 is a perspective view of a disk recording and/or reproducing device according to the present invention;

FIG. 11 is a plan view of the switch mechanism with the first switch turned on and the second switch turned off;

FIG. 12 is a plan view of the switch mechanism with the first and second switches turned on;

DETAILED DESCRIPTION OF THE PREFERRED EMBODIMENTS

A disk recording and/or reproducing device according to the present invention will be described below successively with respect to its different mechanisms and components under the following headings: (1) The general overall arrangement of a disk recording and/or reproducing device; (2) The arrangement of a housing, a mechanical chassis, and a disk chucking mechanism; (3) The arrangement of a mechanical chassis locking mechanism; (4) The arrangement of a disk insertion guide mechanism; (5) The arrangement of a switch mechanism; (6) The arrangement of a disk centering mechanism; (7) The arrangement of a disk transfer mechanism; (8) The arrangement of a gear switching mechanism; (9) The arrangement of a mechanical chassis lifting/lowering mechanism; (10) The arrangement of a transfer roller contacting/releasing mechanism; (11) The arrangement of a dual disk insertion prevention mechanism; and (12) Operation of the disk recording and/or reproducing device.

(1) The general overall arrangement of a disk recording and/or reproducing device When a disk is inserted into a disk recording and/or reproducing device 1 through a disk slot 3 provided in a housing 2, the disk is guided into the housing 2 by a disk insertion guide mechanism 31 (see FIGS. 7 and 8), which is disposed inwardly of the disk slot 3.

Figure 19:
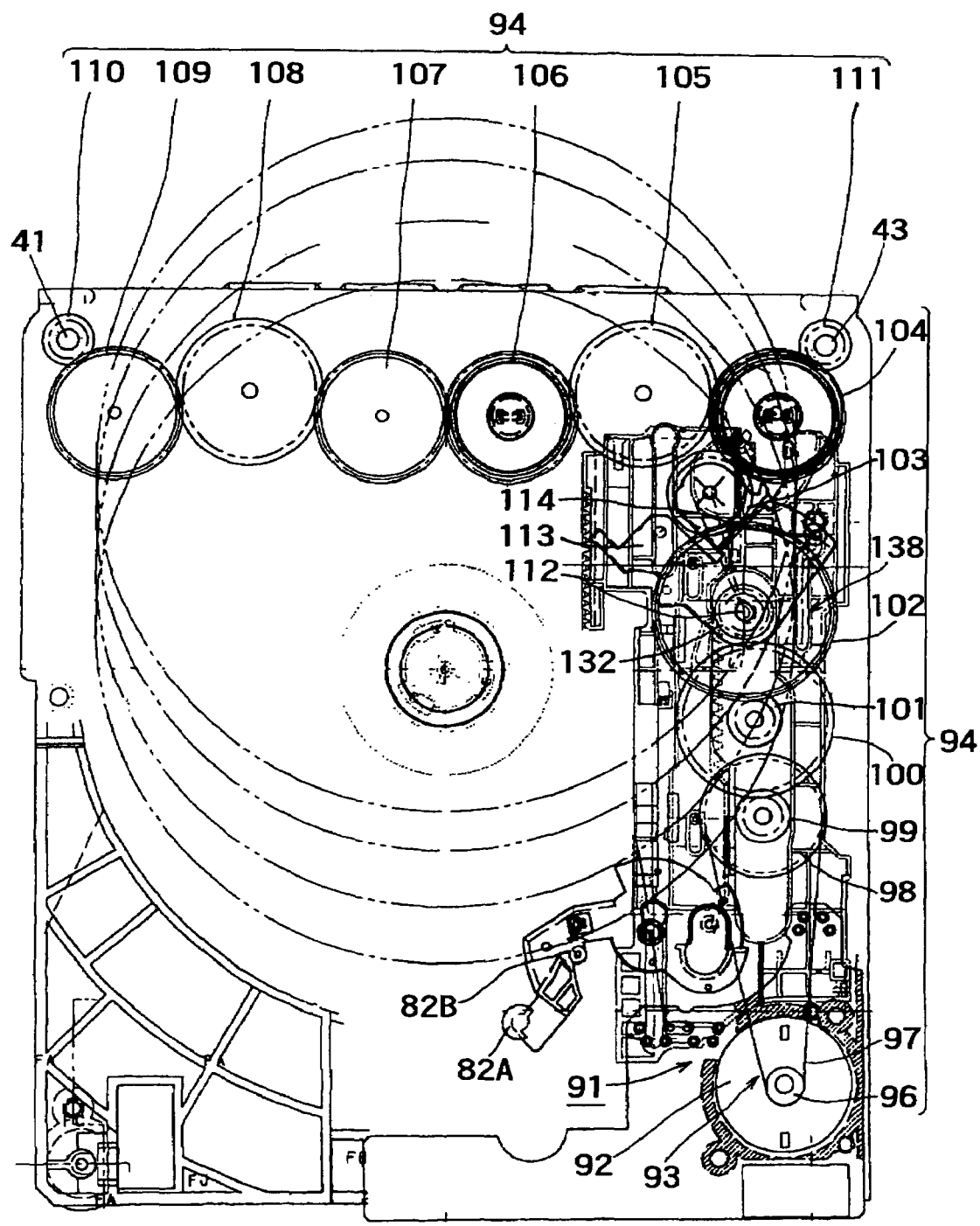
FIG. 19 is a plan view of parts of a rotation transmission assembly on a base plate.
Figure 20:
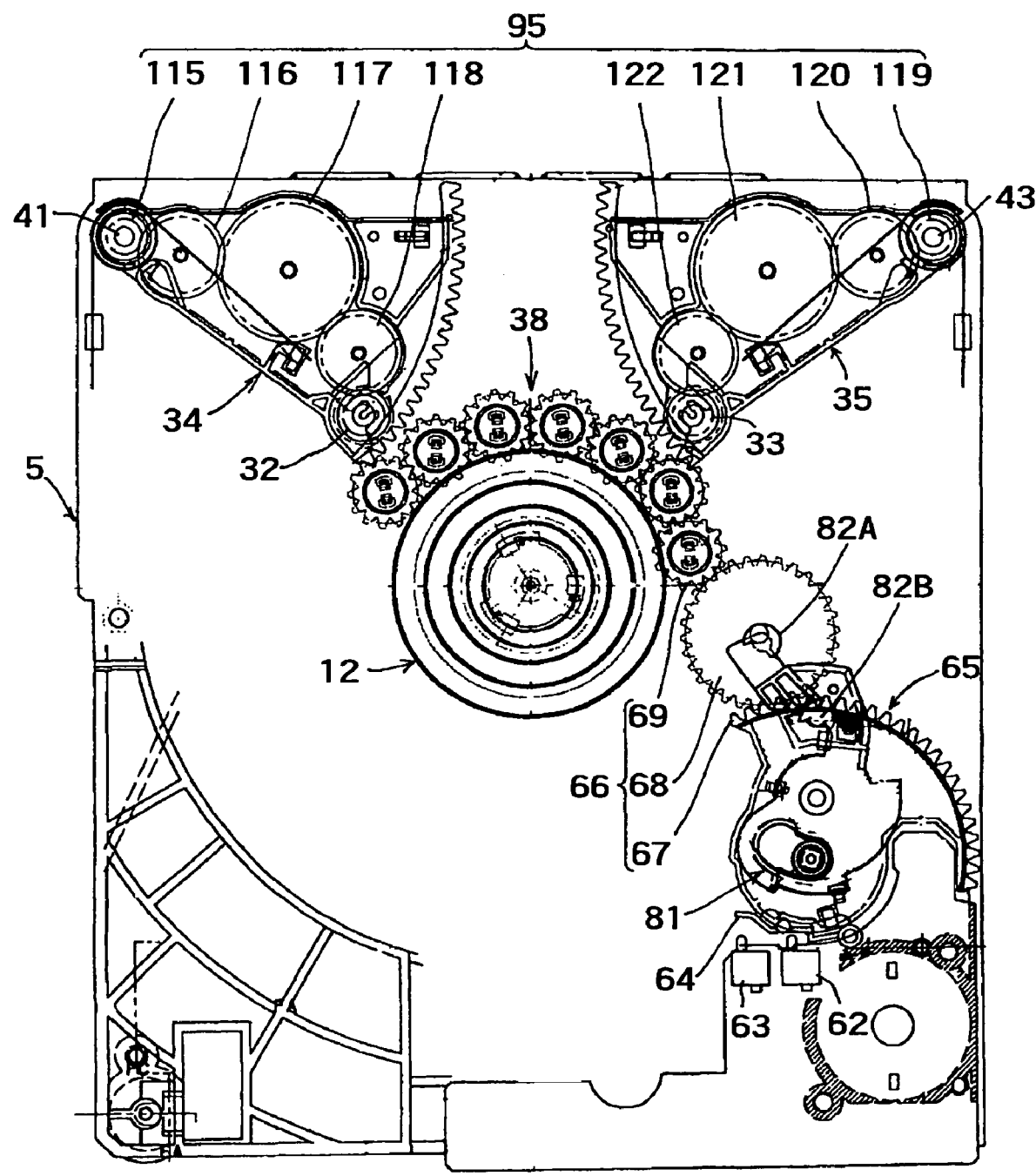
FIG. 20 is a plan view of parts of the rotation transmission assembly on a top plate.

When the disk is inserted to a predetermined position, a switch mechanism 61 (see FIGS. 10 through 12) turns on a motor 92 of a disk transfer mechanism 91 (see FIGS. 19 and 20). The disk is transferred by transfer rollers 32 and 33 (see FIGS. 7 and 8) to a position substantially directly above a disk table 12 and then positioned by a disk centering member 81 (see FIGS. 13 and 14).

After the disk is positioned substantially directly above the disk table 12, a gear switching mechanism 131 (see FIGS. 21 through 25) is actuated. The motor 92 of the disk transfer mechanism 91 actuates a mechanical chassis lifting/lowering mechanism 151 (see FIGS. 26 and 27) to move the disk table 12 mounted on a mechanical chassis 11 toward the disk, and the disk is chucked on the disk table 12. After the disk is chucked on the disk table 12, a transfer roller contacting/releasing mechanism 161 (see FIGS. 22 through 25 and 28) displaces the transfer rollers 32 and 33 from the disk and releases the disk from the transfer rollers 32 and 33 to make the disk free to rotate. A dual disk insertion prevention mechanism 171 (see FIGS. 29 and 30) obstructs the disk slot 3 to prevent another disk from being inserted in dual relation to the inserted disk. Then, information is recorded on and/or reproduced from the disk.

After information is recorded on and/or reproduced from the disk, when an eject button is pressed, the motor 92 is reversed to cause the dual disk insertion prevention mechanism 171 to open the disk slot 3, from which the disk is ejected. At the same time, the mechanical chassis 11 is locked by a mechanical chassis locking mechanism 191 (see FIGS. 35 and 36).

Figure 2:
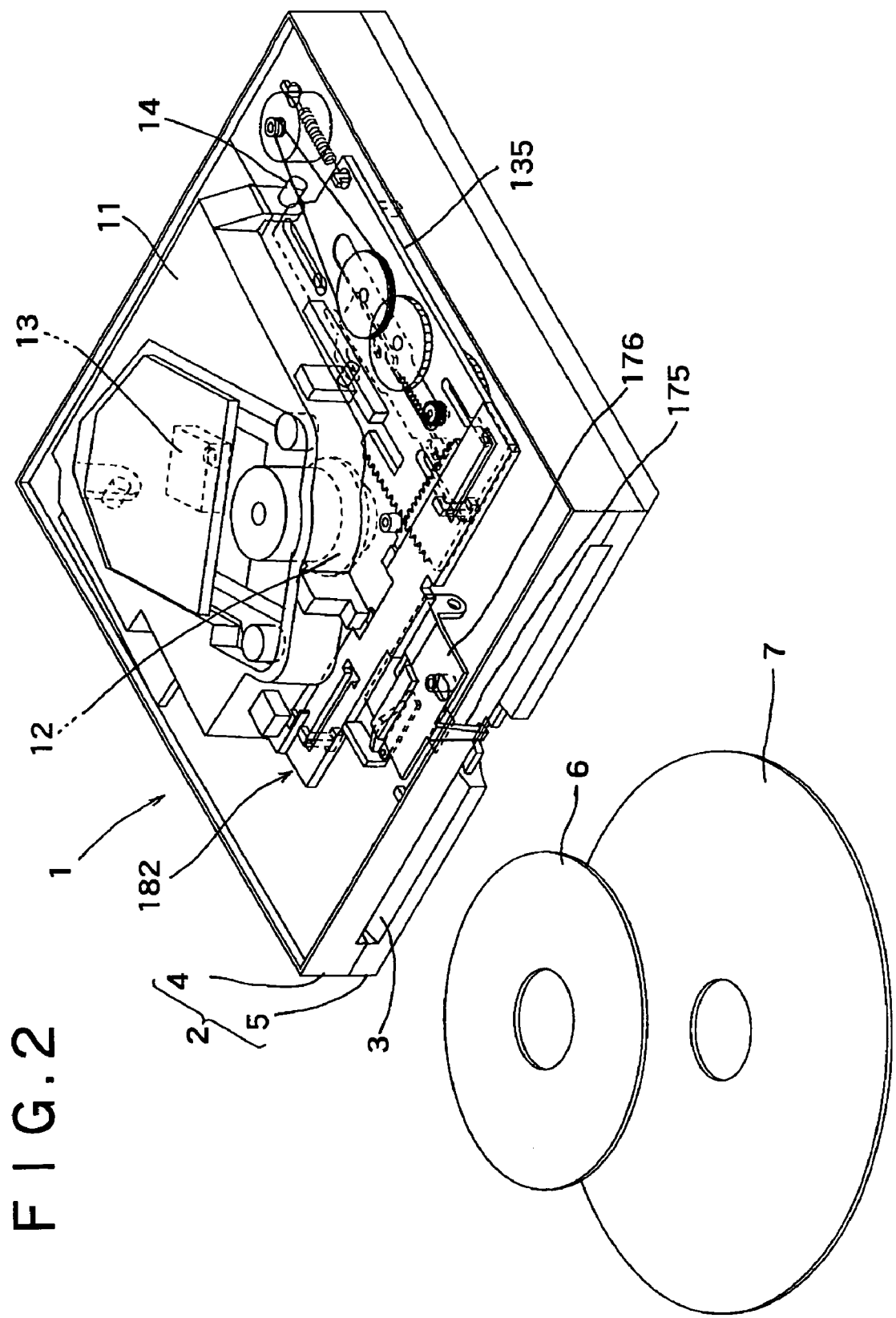
FIG. 2 is a perspective view of the disk recording and/or reproducing device according to the present invention, as viewed from the reverse side thereof.

(2) The arrangement of a housing, a mechanical chassis, and a disk chucking mechanism As shown in FIGS. 1 and 2, the housing 2 has a base plate 4 and a top panel 5. The disk slot 3 is provided between the base plate 4 and the top panel 5. The disk slot 3 is of such a size as to allow an 8-cm disk 6 and a 12-cm disk 7 to be inserted therethrough. The mechanical chassis 11 is mounted on the base plate 4.

Figure 3:
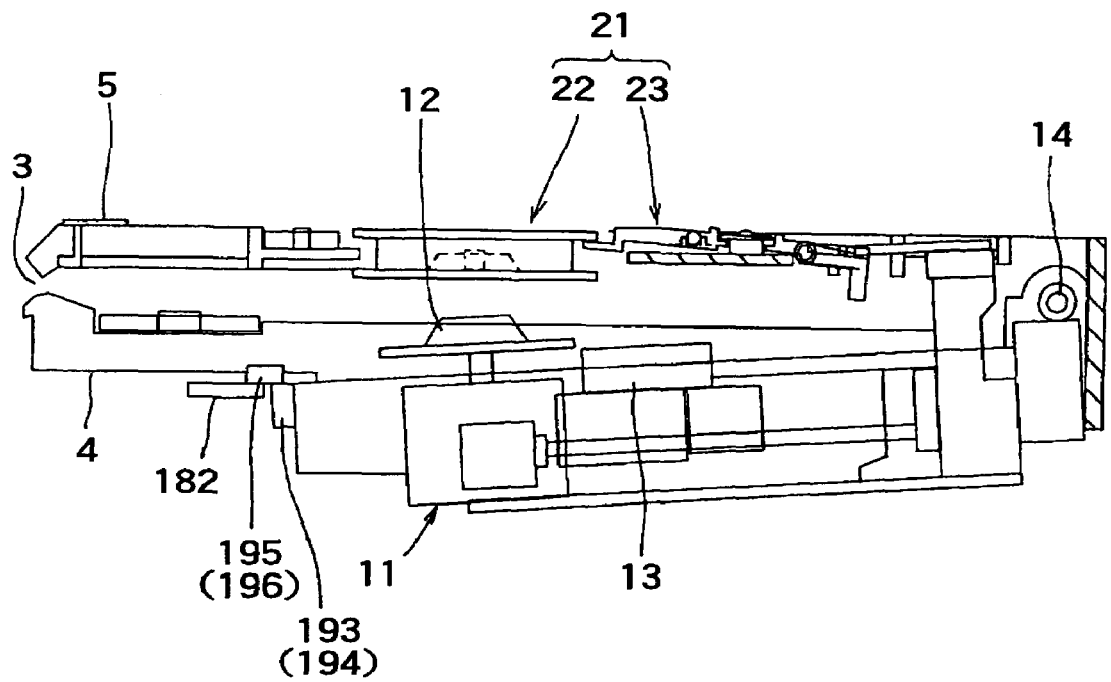
FIG. 3 is a side elevational view of the disk recording and/or reproducing device with a mechanical chassis in a disk unchucking position.
Figure 4:
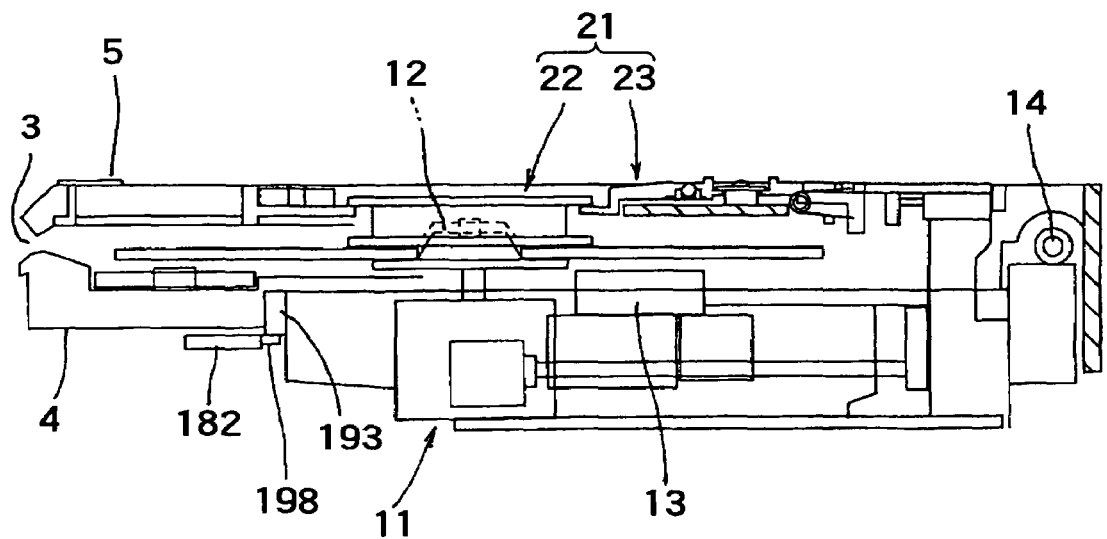
FIG. 4 is a side elevational view of the disk recording and/or reproducing device with the mechanical chassis in a disk chucking position.

As shown in FIGS. 3 and 4, the mechanical chassis 11 supports thereon the disk table (turntable) 12, an optical pickup 13, and the like. The mechanical chassis 11 is angularly movably mounted on the base plate 4 by a pivot shaft 14 for lifting and lowering the disk table 12 between a disk unchucking position (see FIG. 3) and a disk chucking position (see FIG. 4).

Figure 35:
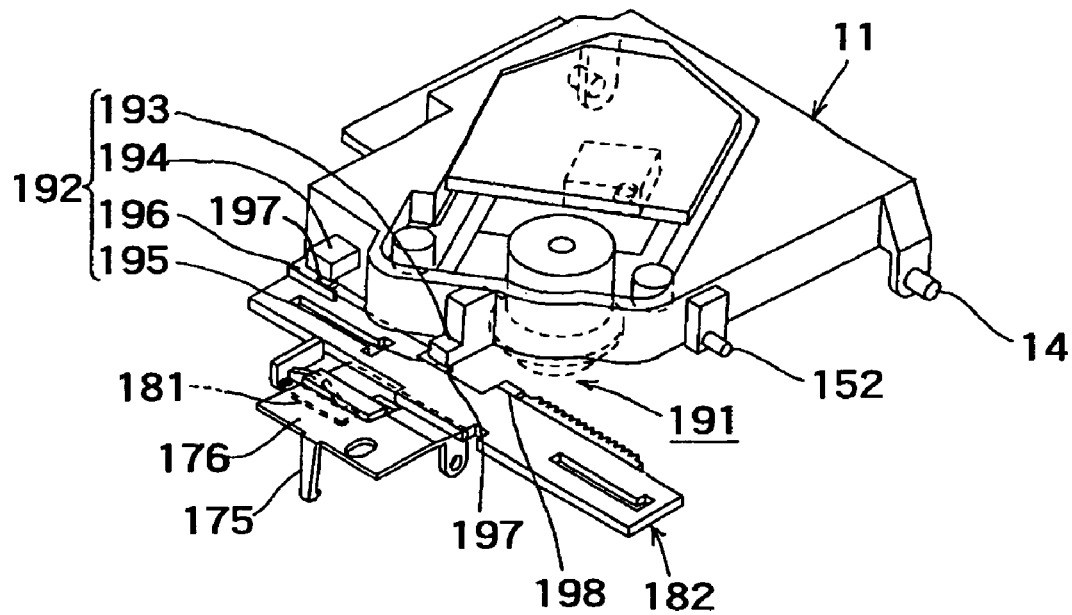
FIG. 35 is a perspective view showing the mechanical chassis locked in the disk unchucking position.
Figure 36:
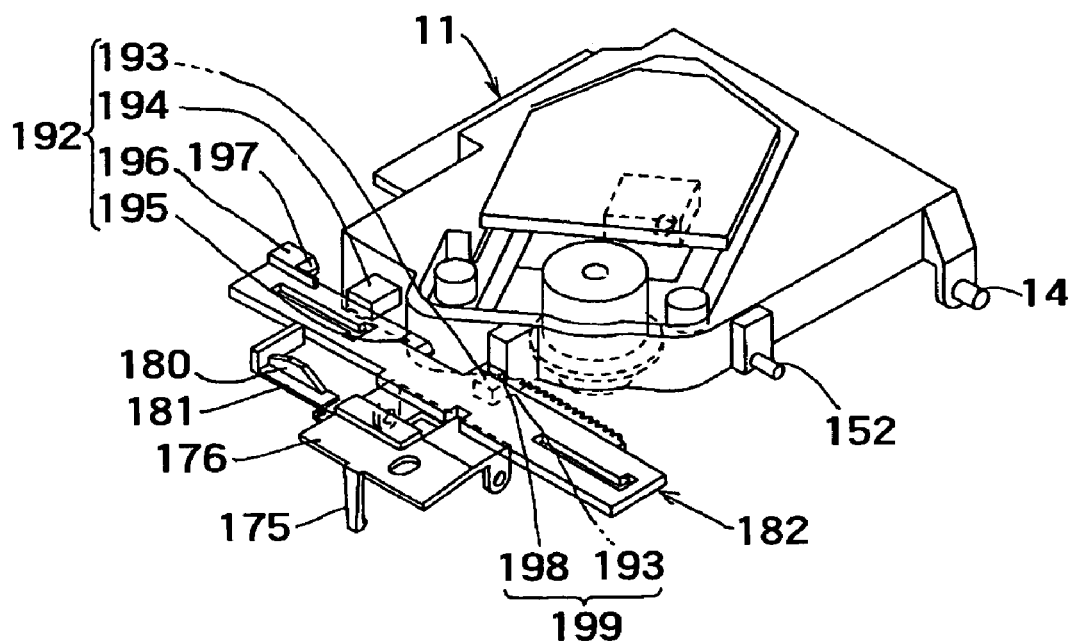
FIG. 36 is a perspective view showing the mechanical chassis locked in the disk chucking position.

When the mechanical chassis 11 is moved to the disk unchucking position, the mechanical chassis 11 is fixed (locked) to the base plate 4 side by the mechanical chassis locking mechanism 191 (see FIGS. 35 and 36).

As shown in FIGS. 3 and 4, a disk chucking mechanism 21 is mounted on the top panel 5. The disk chucking mechanism 21 includes a chucking member 22 and a chucking member support arm 23, which supports the chucking member 22.

Figure 5:
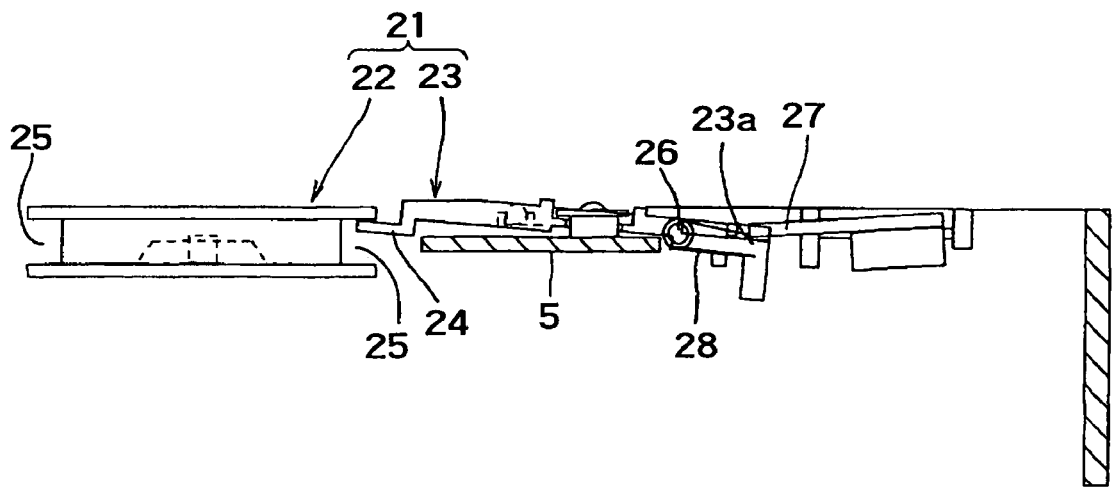
FIG. 5 is a cross-sectional view of a disk chucking mechanism as it is in an unchucking position.
Figure 6:
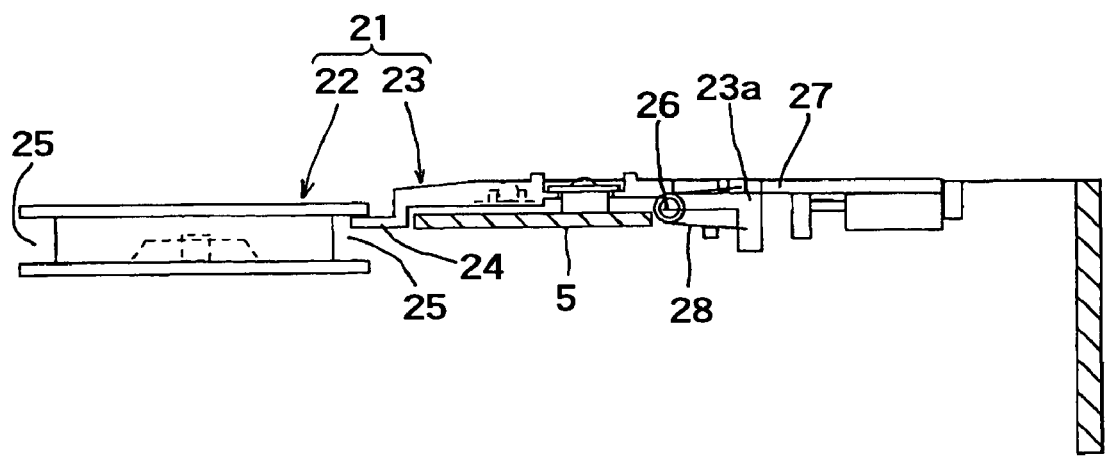
FIG. 6 is a cross-sectional view of the disk chucking mechanism as it is in a chucking position.

As shown at an enlarged scale in FIGS. 5 and 6, the chucking member 22 is in the form of a substantially circular plate made of a synthetic resin with a magnetic metal plate such as an iron plate inserted therein. The chucking member support arm 23 has a bifurcated plate support 24 inserted in a recess 25 provided in an outer circumferential surface of the chucking member 22 to support the chucking member 22. The chucking member support arm 23 is vertically angularly movably mounted on the top panel 5 by a shaft 26. When an end 23a of the chucking member support arm 23 is lowered by an arm operating member 27, the chucking member support arm 23 is turned clockwise about the shaft 26 and tilted upwardly through a certain angle over the top panel 5 (see FIG. 5).

When the end 23a of the chucking member support arm 23 is released from the push by the arm operating member 27, the chucking member support arm 23 is turned counterclockwise under the spring force of a torsion coil spring 28 and moved to a chucking position (see FIG. 6).

(3) The arrangement of a mechanical chassis locking mechanism

As shown in FIG. 35, the mechanical chassis locking mechanism 191 has an unchucking lock assembly 192 for locking the mechanical chassis 11 against swinging movement on the base plate 4 of the housing 2, when the mechanical chassis 11 is in the disk unchucking position.

The unchucking lock assembly 192 includes first and second locked members 193 and 194 disposed in a substantially central area and a side area, respectively, of a free end of the mechanical chassis 11. The unchucking lock assembly 192 further includes first and second locking members 195 and 196 for engaging the first and second locked members 193 and 194, respectively, when the mechanical chassis 11 is to be unchucked.

The first and second locking members 195 and 196 are mounted on a slide member 182 of the dual disk insertion prevention mechanism 171 to be described in detail later on. The first and second locking members 195 and 196 have slanted surfaces 197 at ends thereof. When the slide member 181 is moved to the disk unchucking position, the slanted surfaces 197 engage with and lower the first and second locked members 193 and 194, respectively, to lock the mechanical chassis 11 in the disk unchucking position. FIG. 35 shows the mechanical chassis 11 as it is viewed from below, and hence the first and second locked members 193 and 194 are shown as being raised by the first and second locking members 195 and 196, respectively, in FIG. 35. However, actually as shown in FIG. 3, the first and second locked members 193 and 194 are lowered by the first and second locking members 195 and 196, respectively.

When the slide member 181 moves from the disk unchucking position to the disk chucking position, the first and second locking members 195 and 196 are disengaged from the first and second locked members 193 and 194, as shown in FIG. 36. When the slide member 181 reaches the disk chucking position, a chucking lock assembly 199 locks the mechanical chassis 11 in the disk chucking position. The chucking lock assembly 199 includes a third locking member 198 on the slide member 182 and the first locked member 193. Specifically, the third locking member 198 engages with and raises the first locked member 193. FIG. 36 shows the mechanical chassis 11 as it is viewed from below, and hence the first locked member 193 is shown as being lowered by the third locking member 198. However, as shown in FIG. 4, the first locked member 193 is raised by the third locking member 198.

(4) The arrangement of a disk insertion guide mechanism

The disk insertion guide mechanism 31 serves to insert the disk from the disk slot 3 into the housing 2, while the center of the disk is held in alignment with the center of the disk slot 3.

Figure 7:
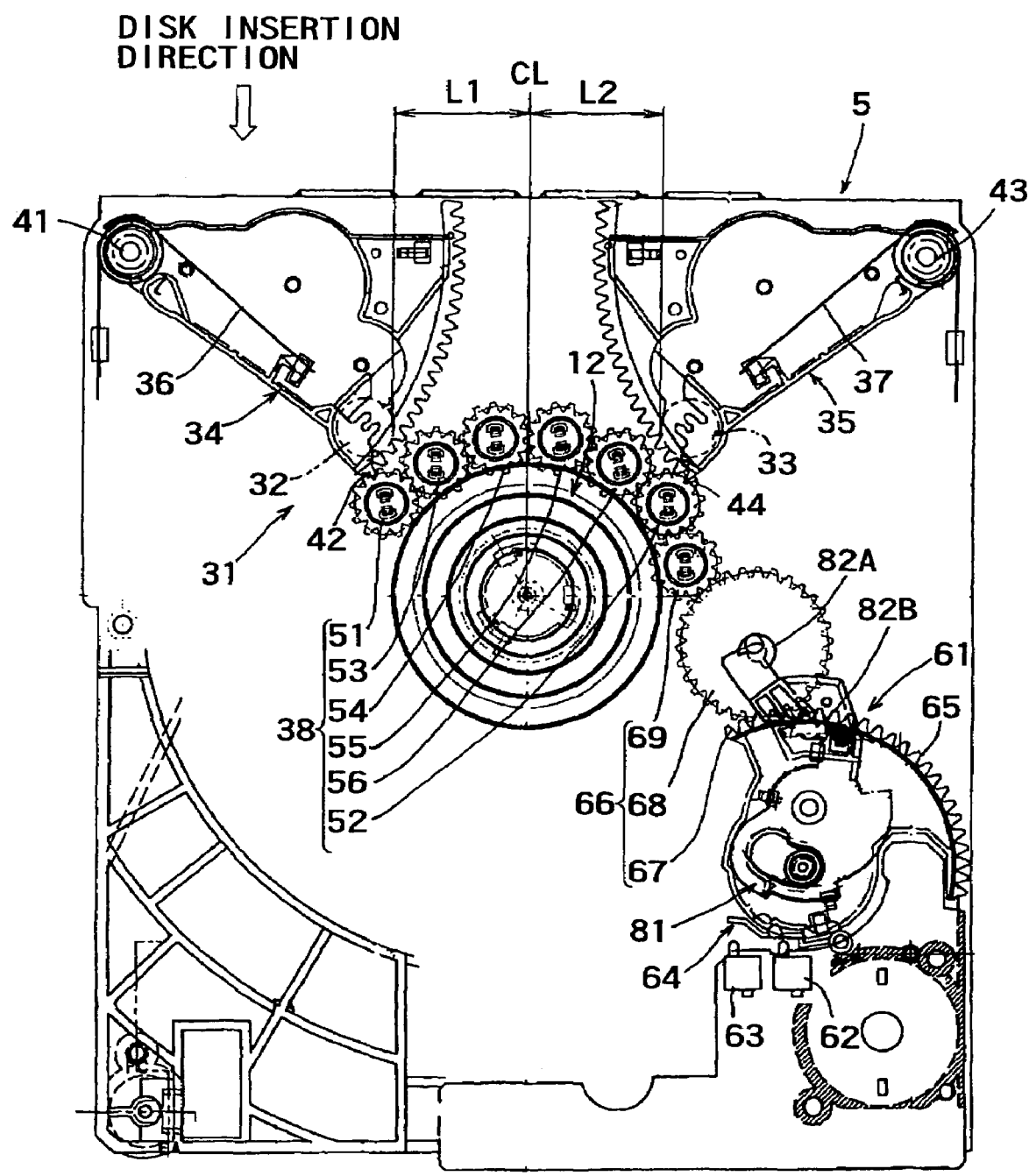
FIG. 7 is a plan view of a disk insertion guide mechanism.

As shown in FIG. 7, the disk insertion guide mechanism 31 includes a pair of transfer rollers (hereinafter referred to as first and second rollers) 32 and 33, a pair of turn arms (hereinafter referred to as first and second arms) 34 and 35 on which the first and second rollers 32 and 33 are mounted. The guide mechanism 31 further includes a pair of torsion coil springs (hereinafter referred to as first and second springs) 36 and 37 for imparting turning forces to the first and second arms 34 and 35, and a synchronous drive gear train 38 for synchronously moving the first and second arms 34 and 35 toward and away from each other.

The first arm 34 is of a substantially sectorial shape and has a pivot end angularly movably mounted by a first shaft 41 on an end of the top panel 5 near the disk slot 3. The first arm 34 has an arcuate gear 42 mounted on a free end thereof about the first shaft 41.

The first arm 34 is normally biased to turn counterclockwise by the first spring 36 and stopped at a position near the disk slot 3. In this state, the first roller 32 mounted on the first arm 34 is in a position spaced a distance L1 from the central position CL of the disk slot 3.

As with the first arm 34, the second arm 35 is of a substantially sectorial shape and has a pivot end angularly movably mounted by a second shaft 43 on another end of the top panel 5 near the disk slot 3. The second arm 35 has an arcuate gear 44 mounted on a free end thereof about the second shaft 43.

The second arm 35 is normally biased to turn clockwise by the second spring 37 and stopped at a position near the disk slot 3. In this state, the second roller 33 mounted on the second arm 35 is in a position spaced a distance L2 from the central position CL of the disk slot 3, and the first roller 32 and the second roller 33 are spaced from each other by a distance L1+L2 that is 8 cm or less.

Figure 8:
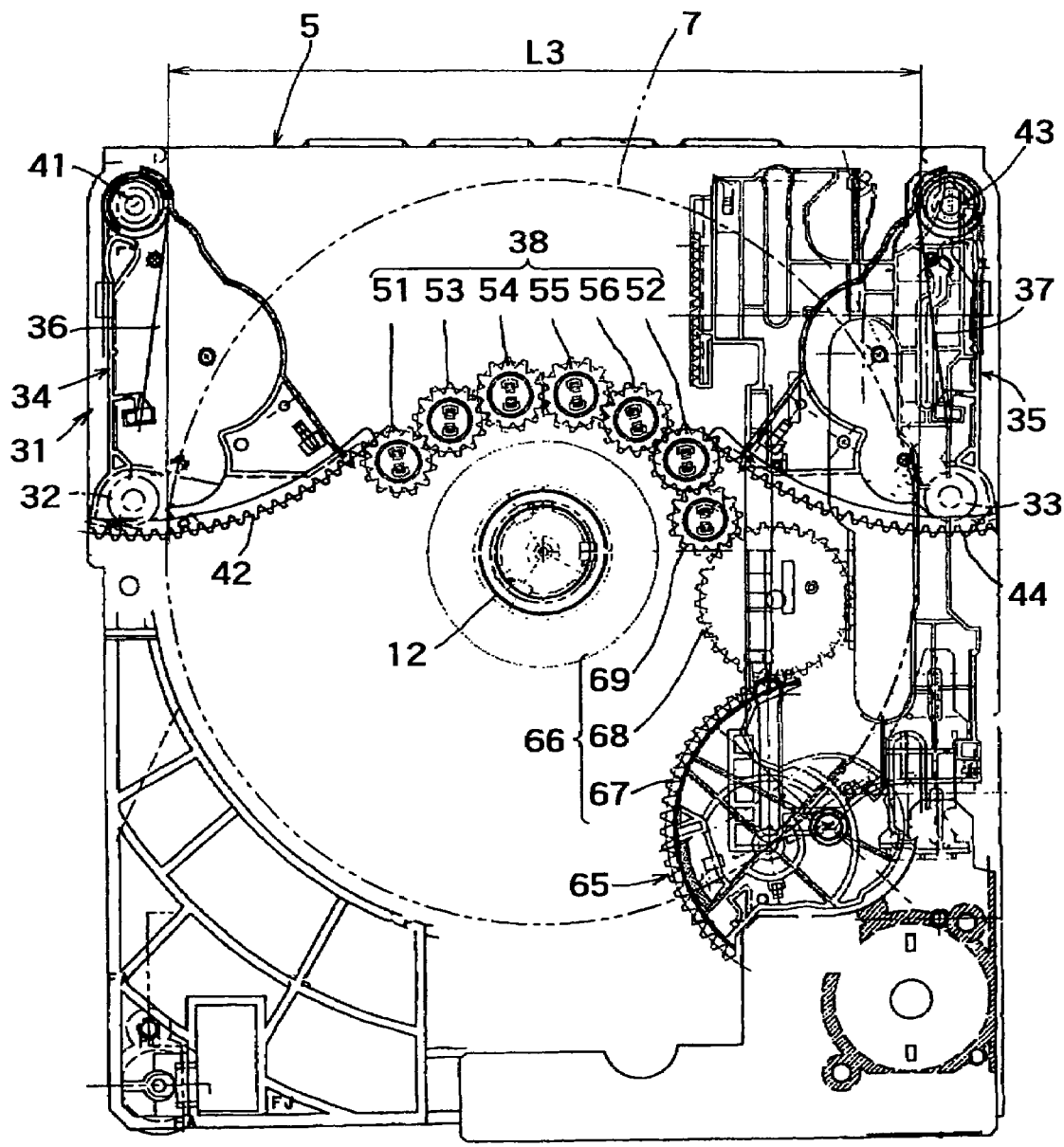
FIG. 8 is a plan view similar to FIG. 7, showing first and second arms spread apart to a maximum degree.

When the first arm 34 is turned most clockwise and the second arm 35 is also turned most counterclockwise as shown in FIG. 8, the first roller 32 and the second roller 33 are spaced from each other by a distance L3 that is greater than 12 cm. Hence, the first and second rollers 32 and 33 are held out of contact with the 12-cm disk 7.

The synchronous drive gear train 38 includes a first gear 51 held in mesh with the sectorial gear 42 of the first arm 34, a second gear 52 held in mesh with the sectorial gear 44 of the second arm 35, and third through sixth gears 53 through 56 interposed between the first and second gears 51 and 52 in mesh therewith.

When either one of the first and second arms 34 and 35 is turned, the other arm is also turned in synchronism therewith, so that the first and second arms 34 and 35 are moved toward and away from each other.

Figure 9:
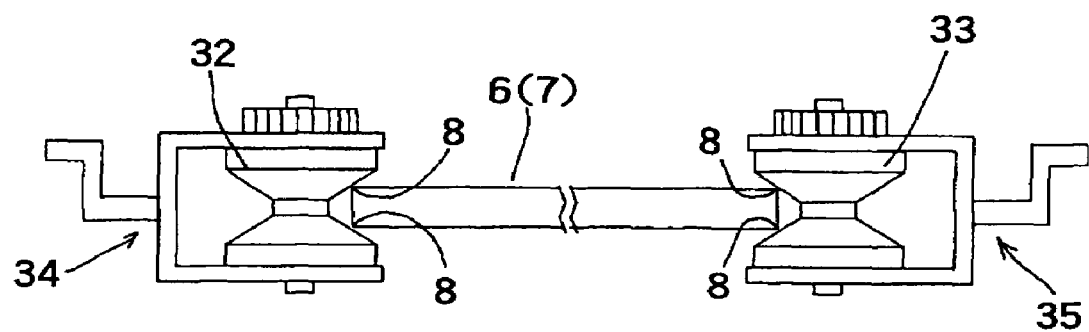
FIG. 9 is a side elevational view of the first and second rollers.

As shown in FIG. 9, the first and second rollers 32 and 33 have circumferential surfaces each of a wedge-shaped cross section for sandwiching upper and lower edges 8 of the peripheral portion of the disk 6, 7 inserted from the disk slot 3.

(5) The arrangement of a switch mechanism

The switch mechanism 61 serves to turn on the motor 92 of the disk transfer mechanism 91, when the disk is inserted to a predetermined position from the disk slot 3.

Figure 10:
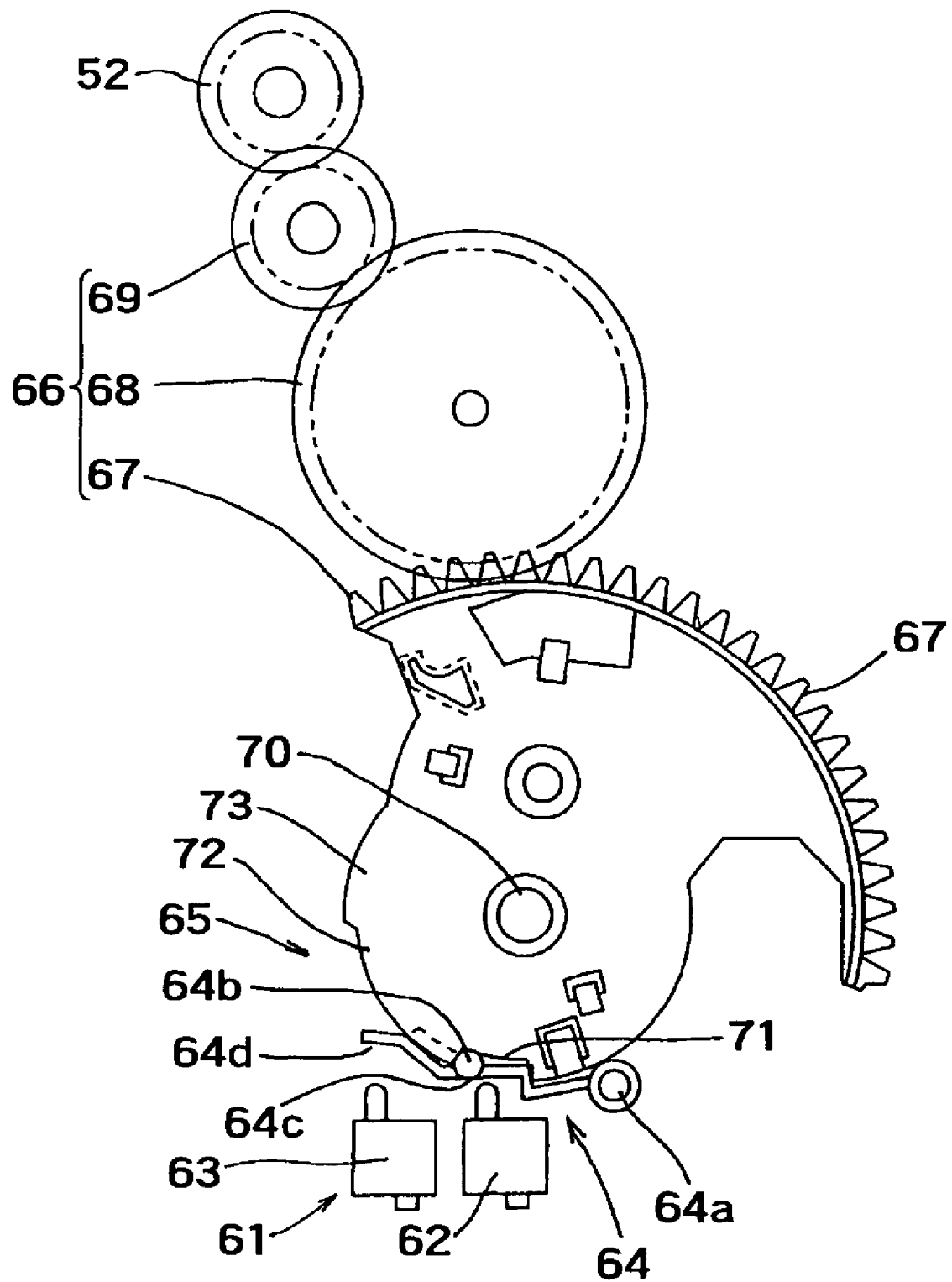
FIG. 10 is a plan view of a switch mechanism with first and second switches turned off.

As shown in FIGS. 10 through 12, the switch mechanism 61 includes first and second switches 62 and 63, a switch operating lever 64 for successively pressing the first and second switches 62 and 63, a rotary cam 65 for moving the switch operating lever 64, and an interlinking gear train 66 for rotating the rotary cam 65 in interlinked relation to the second arm 35 of the disk insertion guide mechanism 31.

The interlinking gear train 66 includes an arcuate gar 67 mounted on the rotary cam 65, a seventh gear 68 held in mesh with the arcuate gar 67, and an eighth gear 69 held in mesh with the seventh gear 68. The eighth gear 69 is held in mesh with the second gear 52 of the disk insertion guide mechanism 31.

The rotary cam 65 has a gearing sleeve 70. The sleeve 70 receives therein a cam mount shaft (not shown) disposed on the top panel 5. The rotary cam 65 is thus mounted on the top panel 5 for rotation about the cam mount shaft.

The arcuate gear 69 is of an arcuate shape extending about the bearing sleeve 70. The rotary cam 65 is angularly movable in interlinked relation to the first arm 34 by the interlinking gear train 66 and the synchronous drive gear train 38. The interlinking gear train 66 is made up of the arcuate gear 67 and the seventh and eighth gears 68 and 69.

The rotary cam 65 has first through third cam faces 71 through 73, which are positioned substantially diametrically opposite to the arcuate gear 67 across the bearing sleeve 70.

The switch operating lever 64 has an end angularly movably mounted on the base plate 4 side by a shaft 64a. The switch operating lever 64 has a circular contact 64b disposed centrally thereon for contact with the first through third cam faces 71 through 73 of the rotary cam 65. The switch operating lever 64 also has a first switch operating member 64c and a second switch operating member 64d. The first switch operating member 64c presses the first switch 62. The second switch operating member 64d presses the second switch 63. The first and second switch operating members 64c and 64d are disposed one on each side of the circular contact 64b.

As shown in FIG. 10, before the disk is inserted into the disk slot 3, the circular contact 64b of the switch operating lever 64 contacts with the first cam face 71. The first switch 62 and the second switch 63 are kept turned off.

When the disk 1 is inserted from the disk slot 3 and spreads the first and second arms 34 and 35 away from each other by a predetermined distance or more, the circular contact 64b of the switch operating lever 64 contacts with the second cam face 72, as shown in FIG. 11. The first switch operating member 64c turns on the first switch 62, while the second switch operating member 64d keeps the second switch 63 turned off.

When the first and second arms 34 and 35 are spread away from each other more than predetermined distance, the circular contact 64b of the switch operating lever 64 contacts with the third cam face 73, as shown in FIG. 12. The first switch operating member 64c turns on the first switch 62, and the second switch operating member 64d turns on the second switch 63.

When the first switch 62 and the third switch 63 are turned off, the switch mechanism 61 de-energizes the motor 92 of the disk transfer mechanism 91, to be described later. When the first switch 62 is turned on, the switch mechanism 61 energizes the motor 92 of the disk transfer mechanism 91. When both the first switch 62 and the third switch 63 are turned on, the switch mechanism 61 controls the rotational speed (RPM) of the motor 92.

(6) The arrangement of a disk centering member

The disk centering member 81 serves to position the center of the disk inserted from the disk slot 3 on the disk table 12. The disk centering member 81 can position the centers of inserted disks having different diameters, e.g., an 8-cm disk and a 12-cm disk, substantially directly above the disk table 12. Also, the centering member 81 can press the gear switching mechanism 131 after the centering of such disks having different diameters is finished.

Figure 13:
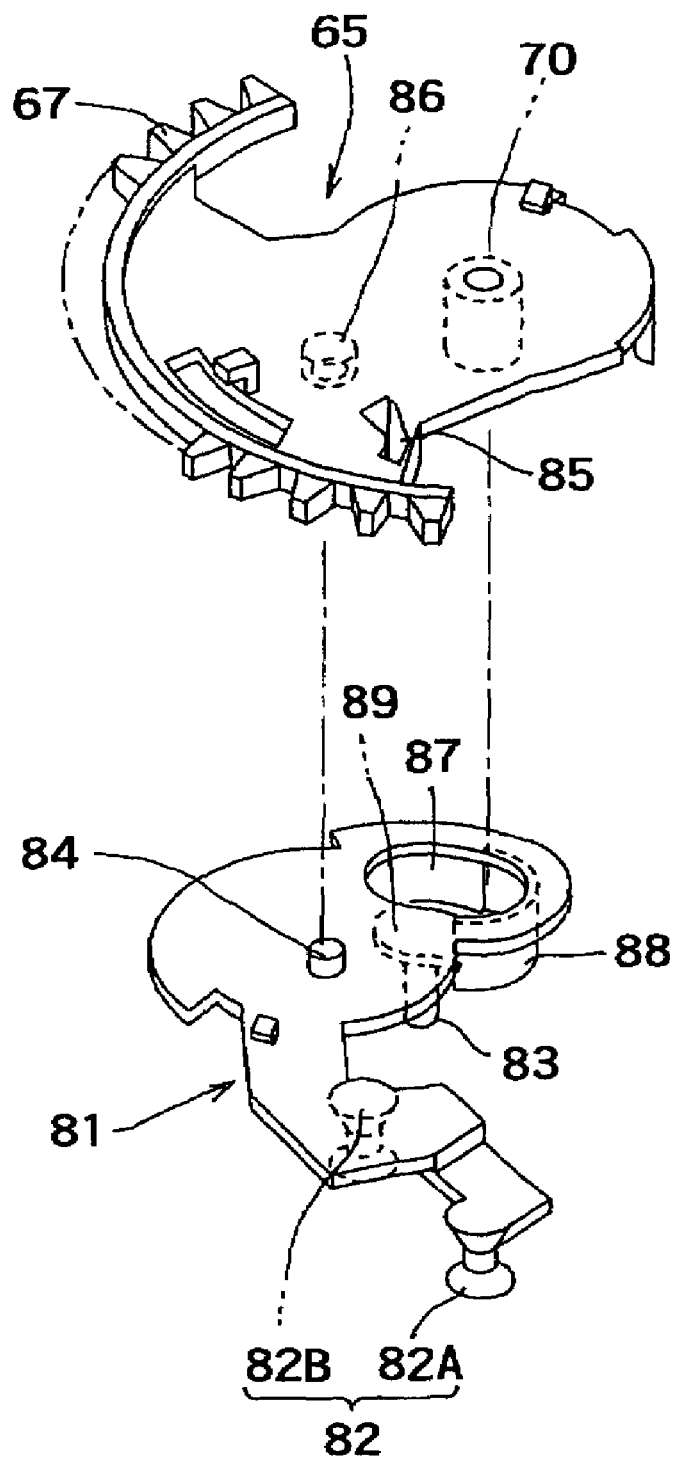
FIG. 13 is a perspective view of a rotary cam and a disk centering member.
Figure 14:
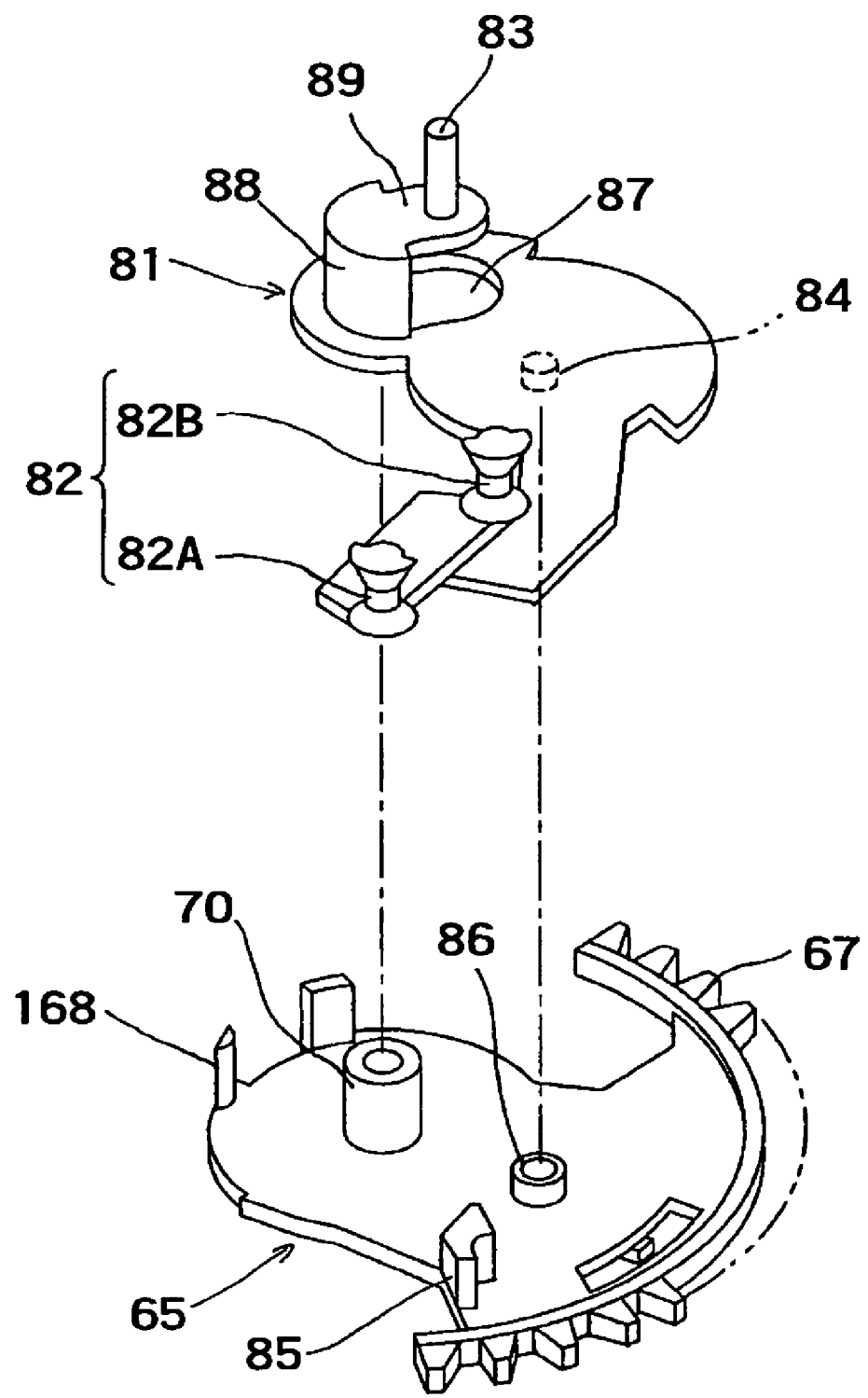
FIG. 14 is a perspective view of the rotary cam and the disk centering member, as viewed from the reverse side thereof.

As shown in FIGS. 13 and 14, the disk centering member 81 has a disk abutment assembly 82 on one end and an operating member 83 on the other end for pressing a rack 134 of the gear switching mechanism 131 to be described later. The disk centering member 81 is angularly movably supported at a portion thereof between the disk abutment assembly 82 and the operating member 83 by a shaft 84. When a disk transferred by the disk transfer mechanism 91, which will be described below, abuts against the disk abutment assembly 82 and presses the disk abutment assembly 82, the disk centering member 81 is turned about the shaft 84. When the center of the disk arrives at a position substantially directly above the disk table 12, a stopper 85 disposed on the rotary cam 65 stops the turning movement of the disk centering member 81, and the disk abutment assembly 82 positions the disk.

The disk abutment assembly 82 includes a first disk abutment 82A and a second disk abutment 82B. The first disk abutment 82A abuts against an 8-cm disk 6, which is transferred, and turning the disk centering member 81 through a predetermined angular interval into a position where the 8-cm disk 6 is centered. The second disk abutment 82B abuts against a 12-cm disk 7, which is transferred, and turning the disk centering member 81 through the same angular interval as the first disk abutment 82A turning the disk centering member 81.

The first disk abutment 82A and the second disk abutment 82B are spaced from the shaft 84 by different distances and are angularly positioned at different angles around the shaft 84 for thereby correcting the difference between the diameters of the 8-cm disk 6 and the 12-cm disk 7. The correction allows the disk centering member 81 to turn the substantially the same angular interval until the centering member 81 centers the 8-cm disk 6 and the 12-cm disk 7. The 12-cm disk 7 is prevented from interfering (contacting) with the first disk abutment 82A, and the 8-cm disk 6 is prevented from interfering (contacting) with the second disk abutment 82B.

The disk centering member 81 is angularly movably mounted on the rotary cam 65 by the shaft 84. The shaft 84 is inserted in a bearing 86 disposed on the rotary cam 65. The disk centering member 81 also has an arcuate oblong hole 87 provided therein around the shaft 84. The bearing sleeve 70 of the rotary cam 65 is inserted in the arcuate oblong hole 87. Therefore, the disk centering member 81 is angularly movable about the shaft 84 within an angular range provided by the arcuate oblong hole 87.

The first disk abutment 82A and the second disk abutment 82B are positioned substantially diametrically opposite to the arcuate oblong hole 87 across the shaft 84. As described above, the first disk abutment 82A abuts against a leading edge portion of the 8-cm disk 6, which is inserted from the disk slot 3, and the second disk abutment 82B abuts against a leading edge portion of the 12-cm disk 7, which is inserted from the disk slot 3.

The first disk abutment 82A is located at a position spaced from the shaft 84 by a greater distance than the second disk abutment 82B. The second disk abutment 82B is located at a position closer to the shaft 84 than the first disk abutment 82A and kept out of contact with the 8-cm disk 7. The difference between the distance from the shaft 84 to the first disk abutment 82A and the distance from the shaft 84 to the second disk abutment 82B is selected such that the disk centering member 81 turns the substantially the same angular interval until the centering member 81 centers the 8-cm disk 6 and the 12-cm disk 7.

The disk centering member 81 has a semicylindrical wall 88 disposed at an end of the oblong hole 87. An overhanging tongue 89 is joined to the upper end of the semicylindrical wall 88 in covering relation to the arcuate oblong hole 87. The operating member 83 is mounted on the distal end of the tongue 89 for pressing the rack 134 of the gear switching mechanism 131.

Figure 15:
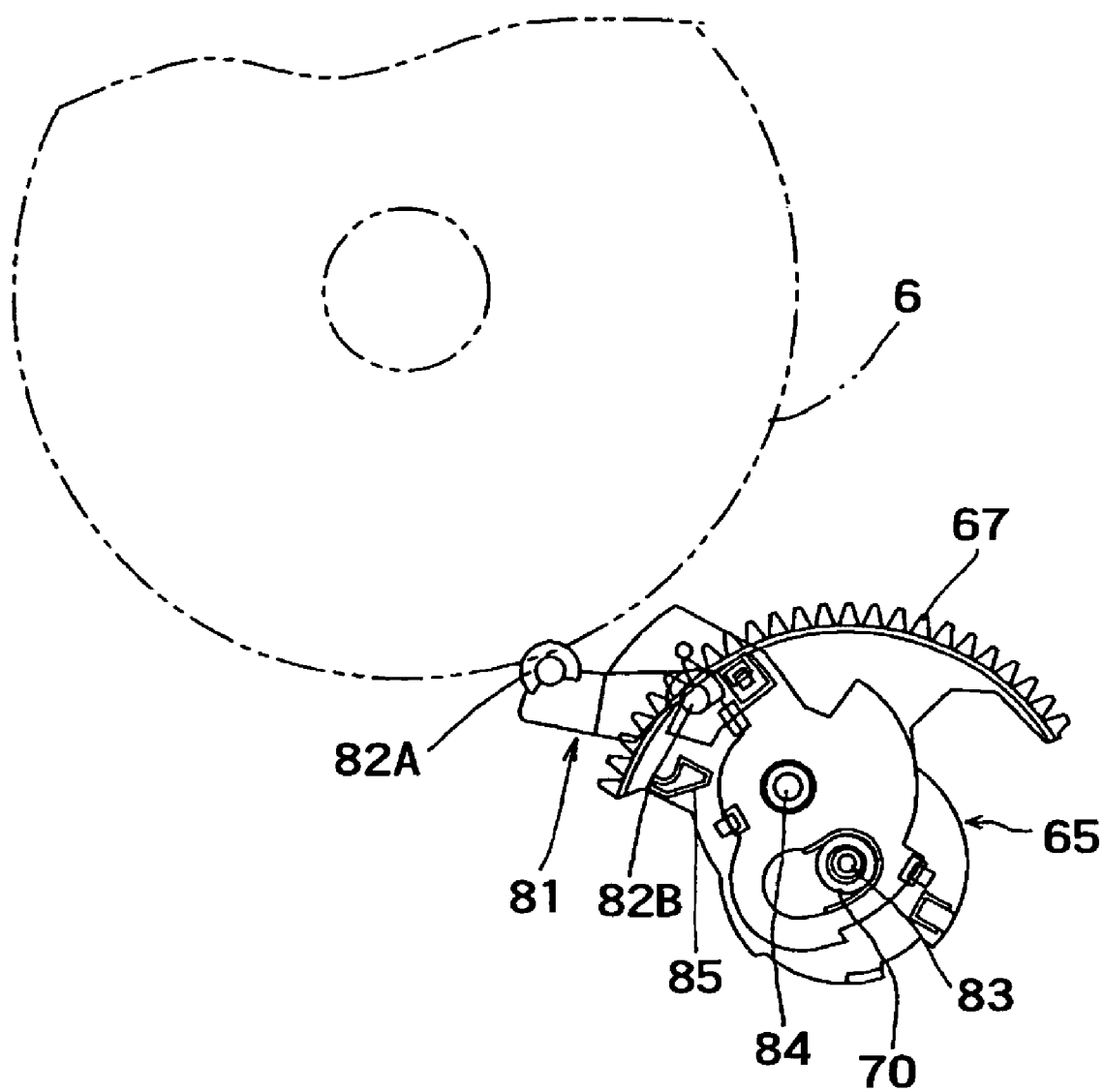
FIG. 15 is a plan view showing an 8-mm disk held in abutment against the disk centering member.

As shown in FIG. 15, when the leading edge portion of the 8-cm disk 6 inserted from the disk slot 3 by the disk transfer mechanism 91 abuts against the first disk abutment member 82A, the disk centering member 81 is pressed and turned counterclockwise about the shaft 84.

Figure 16:
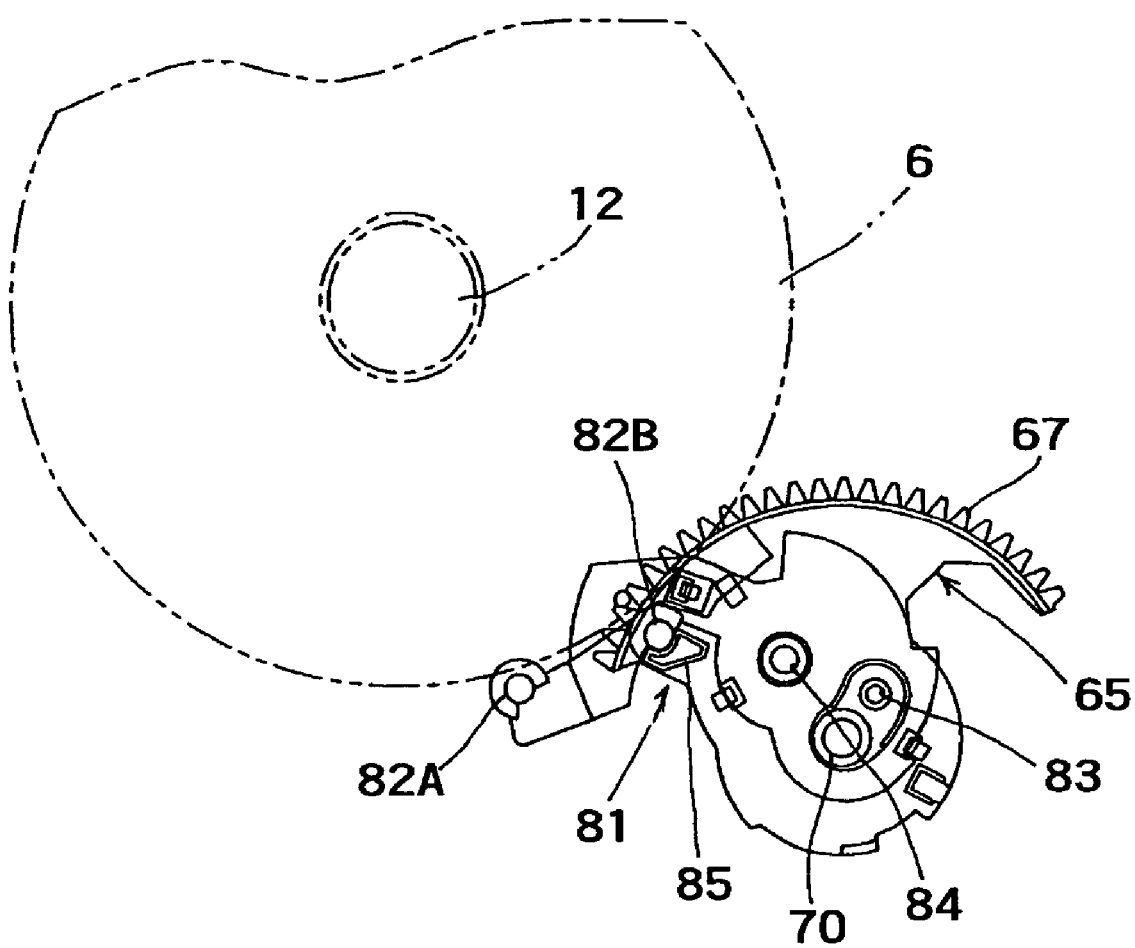
FIG. 16 is a plan view showing the 8-mm disk centered by the disk centering member.

As shown in FIG. 16, when the center of the 8-cm disk 6 arrives at a position substantially directly above the disk table 12, the disk centering member 81 is prevented by the stopper 85 from being further turned, thereby positioning the 8-cm disk 6. The operating member 83 presses the rack 134 of the gear switching mechanism 131.

Figure 17:
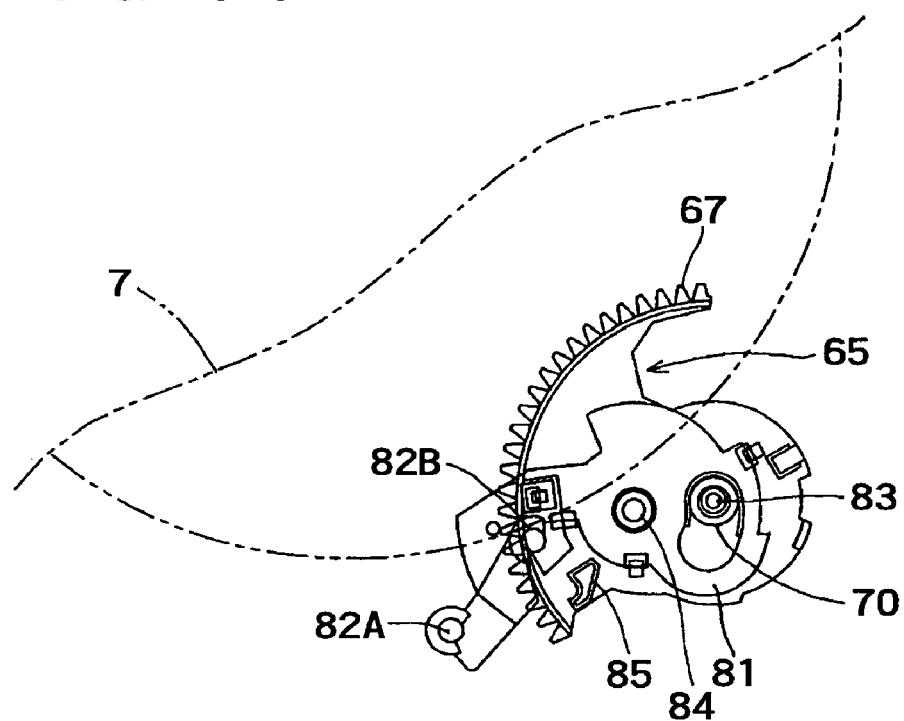
FIG. 17 is a plan view showing a 12-mm disk held in abutment against the disk centering member.

As shown in FIG. 17, when the vicinity of the leading edge portion of the 12-cm disk 7 inserted from the disk slot 3 by the disk transfer mechanism 91 presses the second disk abutment member 82B, the disk centering member 81 is turned counterclockwise about the shaft 84.

Figure 18:
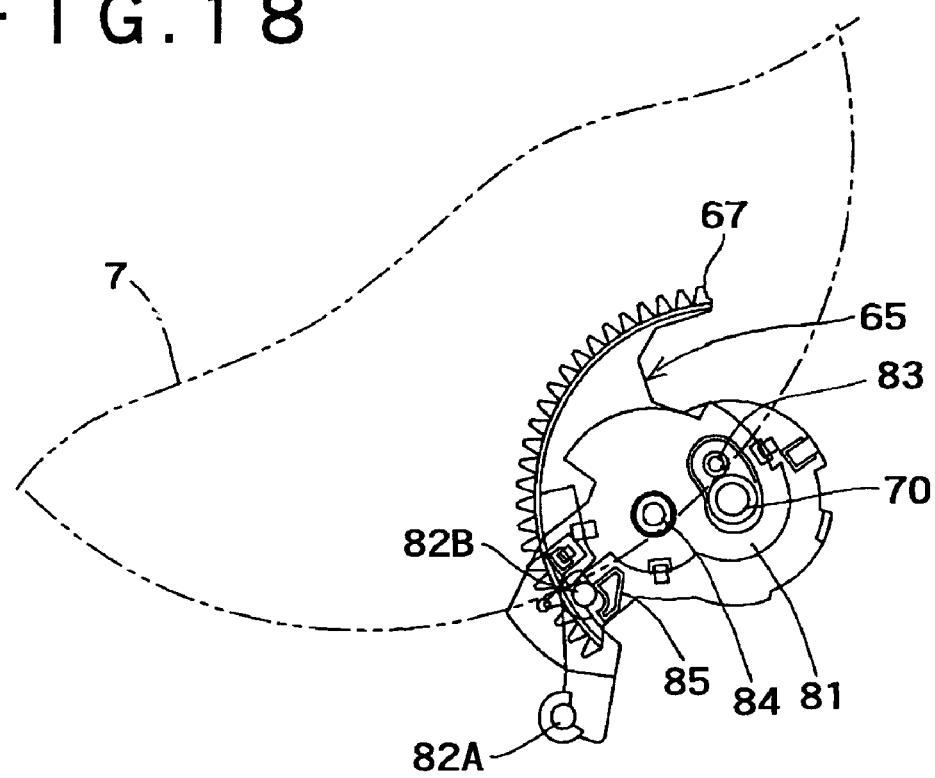
FIG. 18 is a plan view showing the 12-mm disk centered by the disk centering member.

As shown in FIG. 18, when the center of the 12-cm disk 7 arrives at a position substantially directly above the disk table 12, the disk centering member 81 is prevented by the stopper 85 from being further turned, thereby positioning the 12-cm disk 7. The operating member 83 presses the rack 134 of the gear switching mechanism 131.

(7) The arrangement of a disk transfer mechanism

The disk transfer mechanism 91 serves to transfer the disk inserted into the disk slot 3.

As shown in FIGS. 19 and 20, the disk transfer mechanism 91 has a motor 92 and a rotation transmission assembly 93. The motor is turned on and off by the switch mechanism 61. The rotation transmission assembly 93 transmits the rotation of the motor 92 to the first roller 32 and the second roller 33.

The rotation transmission assembly 93 includes a base-plate rotation transmitter 94 (FIG. 19) mounted on the base plate 4 and a top-plate rotation transmitter 95 (FIG. 20) mounted on the top plate 5.

As shown in FIG. 19, the base-plate rotation transmitter 94 includes a first pulley 96, an endless belt 97, a second pulley 98, an eleventh gear 99, a twelfth gear 100, a thirteenth gear 101, a fourteenth gear 102, a swing gear 103, a sixteenth gear 104, a seventeenth gear 105, an eighteenth gear 106, a nineteenth gear 107, a twentieth gear 108, a twenty-first gear 109, a twenty-second gear 110, and a twenty-third gear 111. The first pulley 96 is mounted on the shaft of the motor 92. The endless belt 97 has an end trained around the first pulley 96. The second pulley 98 trains the other end of the endless belt 97. The eleventh gear 99 is mounted on the shaft of the second pulley 98. The twelfth gear 100 is held in mesh with the eleventh gear 99. The thirteenth gear 101 is integrally formed with the twelfth gear 100. The fourteenth gear 102 is held in mesh with the thirteenth gear 101. The swing gear 103 as a fifteenth gear is held in mesh with the fourteenth gear 102. The sixteenth gear 104 is capable of meshing with the swing gear 103, which is the fifteenth gear. The seventeenth gear 105 is held in mesh with the sixteenth gear 104. The eighteenth gear 106 is held in mesh with the seventeenth gear 105. The nineteenth gear 107 is held in mesh with the eighteenth gear 106. The twentieth gear 108 is held in mesh with the nineteenth gear 107. The twenty-first gear 109 is held in mesh with the twentieth gear 108. The twenty-second gear 110 is held in mesh with the twenty-first gear 109. The twenty-third gear 111 is held in mesh with the sixteenth gear 104.

The twenty-second gear 110 is rotatably disposed around the first shaft 41 about which the first arm 34 is angularly movable, and the twenty-third gear 111 is rotatably disposed around the second shaft 43 about which the second arm 35 is angularly movable.

The swing gear 103 as the fifteenth gear is mounted on a gear support member 113, which is swingable about a shaft 112. The gear support member 113 has a boss 114 engaging in a cam groove 138 provided in a gear switching member of the gear switching mechanism 131 to be described later. When the gear switching member slides, the gear support member 113 is turned about the shaft 112 for displacing the swing gear 103 as the fifteenth gear selectively into a position in mesh with the sixteenth gear 104 and a position out of mesh with the sixteenth gear 104.

As shown in FIG. 20, the top-plate rotation transmitter 95 includes a twenty-fourth gear 115 rotatably disposed around the first shaft 41 about which the first arm 34 is angularly movable, a twenty-fifth gear 116 held in mesh with the twenty-fourth gear 115, a twenty-sixth gear 117 held in mesh with the twenty-fifth gear 116, and a twenty-seventh gear 118 held in mesh with the twenty-sixth gear 117. The rotation transmitter 95 further includes a twenty-eighth gear 119 rotatably disposed around the second shaft 43 about which the second arm 35 is angularly movable, a twenty-ninth gear 120 held in mesh with the twenty-eighth gear 119, a thirtieth gear 121 held in mesh with the twenty-ninth gear 120, and a thirty-first gear 122 held in mesh with the thirtieth gear 121. The top-plate rotation transmitter 95 is disposed within the range of the height of the chucking member support arm 23. The height is defined in a state that the support arm 23 of the disk chucking mechanism 21 is raised through the certain angle over the top panel 5.

When the motor 92 is energized, the base-plate rotation transmitter 94 and the top-plate rotation transmitter 95 rotate the first roller 32 and the second roller 33 to transfer the disk.

(8) The arrangement of a gear switching mechanism

The gear switching mechanism 131 serves to lift and lower the mechanical chassis lifting/lowering mechanism 151, to be described below, with the motor 92 of the disk transfer mechanism 91 to chuck and unchuck the disk. Stated otherwise, the gear switching mechanism 131 switches the power of the motor 92, which has been used to actuate the disk transfer mechanism 91, for actuating the mechanical chassis lifting/lowering mechanism 151.

Figure 21:
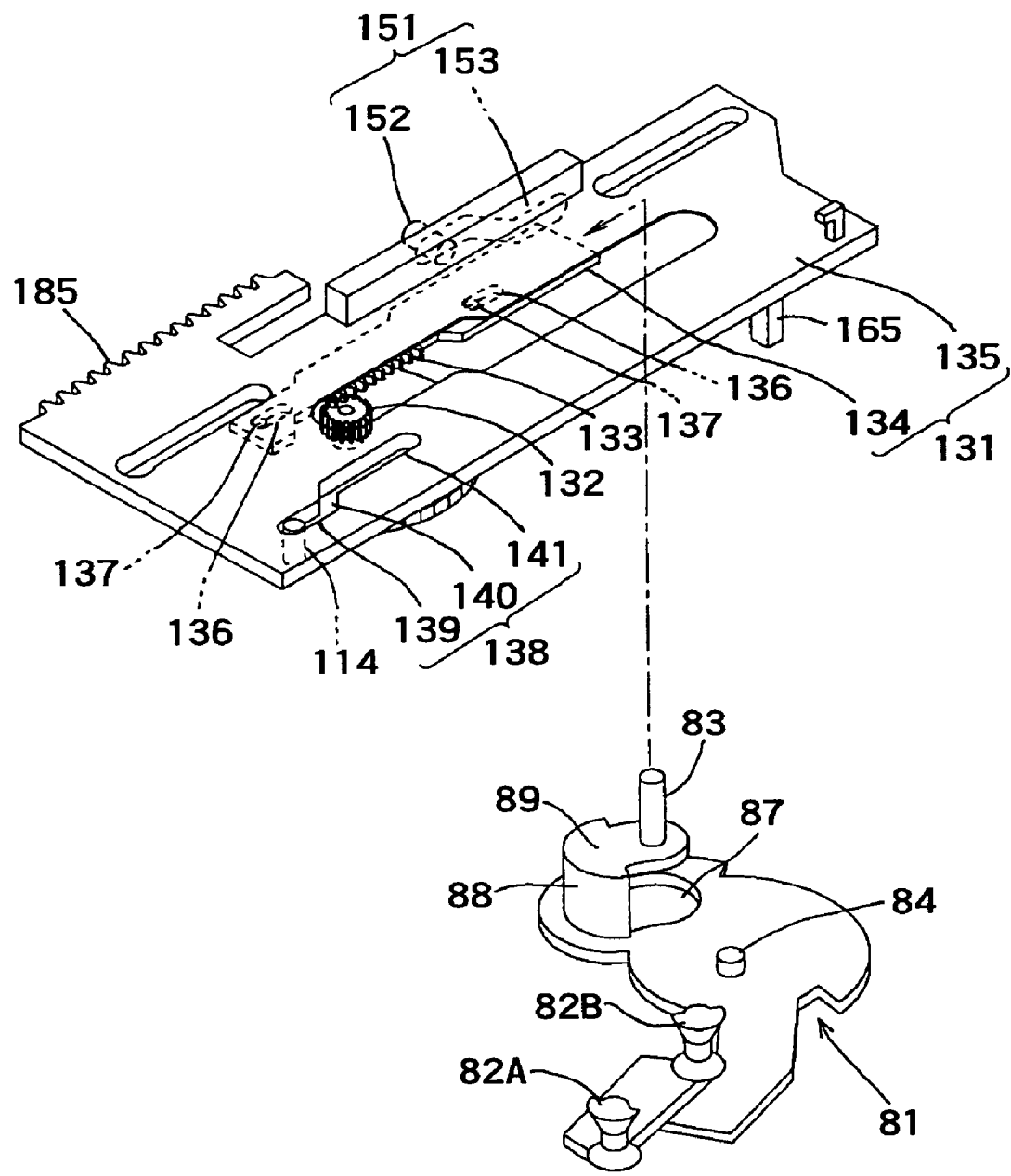
FIG. 21 is a perspective view of essential parts of a gear switching mechanism and the disk centering member.

As shown in FIG. 21, the gear switching mechanism 131 includes the rack 134 and a gear switching member 135. The rack 134 is capable of meshing with a pinion gear 132, which is integral with the fourteenth gear 102 of the gear train of the rotation transmission assembly 93 of the disk transfer mechanism 91. The rack 134 slidably actuates the gear switching member 135.

The rack 134 has a linear gear 133 pressed by the operating member 83 of the disk centering member 81 to slide into mesh with the pinion gear 132, when the disk is transferred to a position above the disk table 12 by the disk transfer mechanism 91.

A slot 136 and a pin 137 couple the rack 134 and the gear switching member 135 each other. When the rack 134 slides to bring the pin 137 into abutment against an end of the slot 136, the rack 134 and the gear switching member 135 slide in unison with each other.

The gear switching member 135 has a swing-gear switching cam groove 138. The cam groove 138 moves the swing gear 103 as the fifteenth gear of the gear train of the rotation transmission assembly 93 of the disk transfer mechanism 91 selectively into a first position and a second position. The first position is held in mesh with the sixteenth gear 104, and the second position is held in out of mesh with the sixteenth gear 104.

The swing-gear switching cam groove 138 includes a first groove 139, a slanted second groove 140, and a third groove 141. The first groove 139 extends in the sliding direction of the gear switching member 135 for holding the swing gear 103 in the first position. The slanted second groove 140 is contiguous to an end of the first groove 139 for moving the swing gear 103 from the first position to the second position. The third groove 141 is contiguous to an end of the second groove 140 and extends in the sliding direction of the gear switching member 135 for holding the swing gear 103 in the second position. When the boss 114 on the gear support member 113 is positioned in the first groove 139, the swing gear 103 as the fifteenth gear is held in mesh with the sixteenth gear 104.

Figure 22:
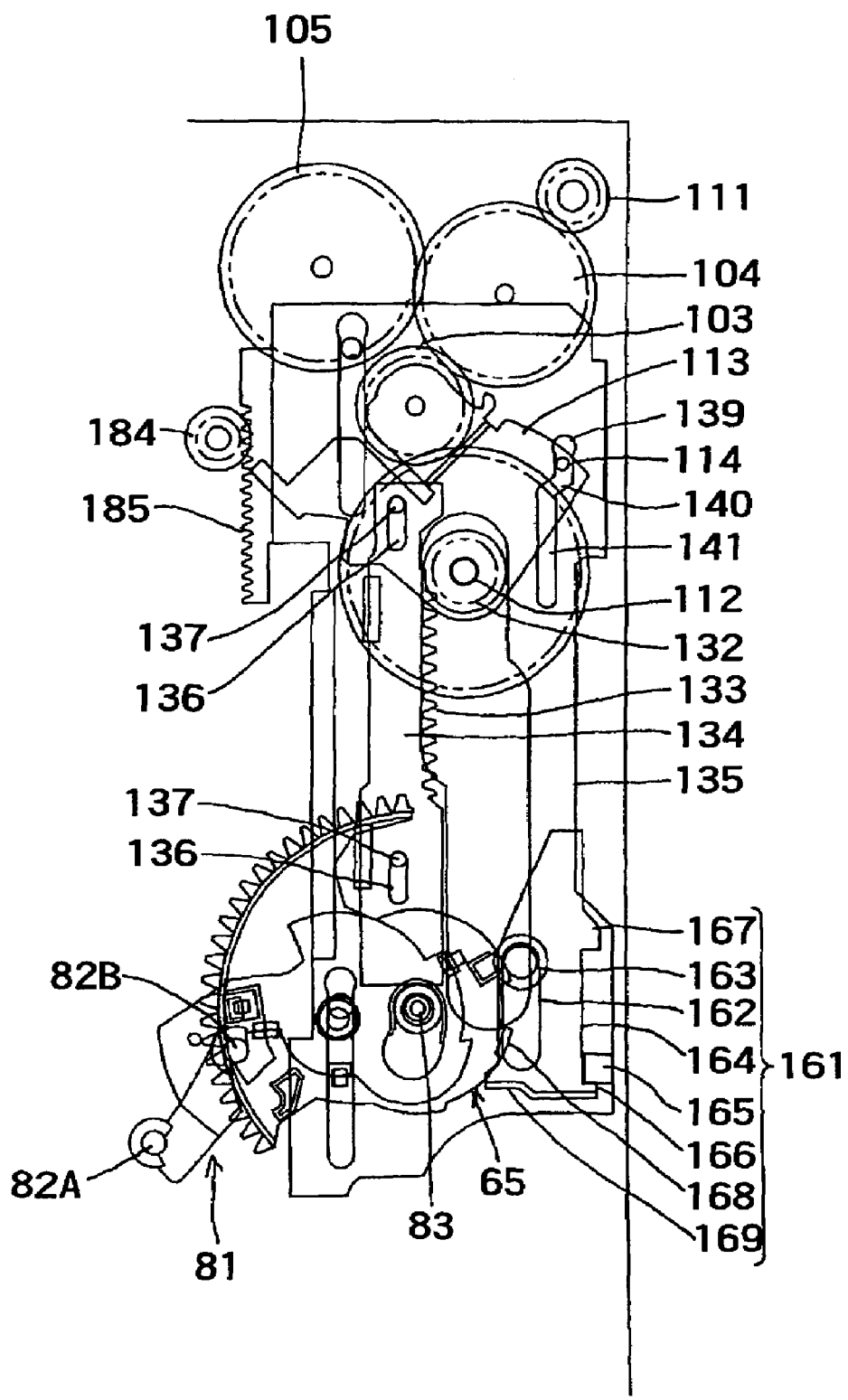
FIG. 22 is a plan view showing the manner in which the gear switching mechanism operates.

The gear switching mechanism 131 is of the above structure. Before the disk is inserted from the disk slot 3 into the housing 2, the boss 114 on the gear support member 113 is positioned in the first groove 139. The swing gear 103 is held in mesh with the sixteenth gear 104, as shown in FIG. 22.

Figure 23:
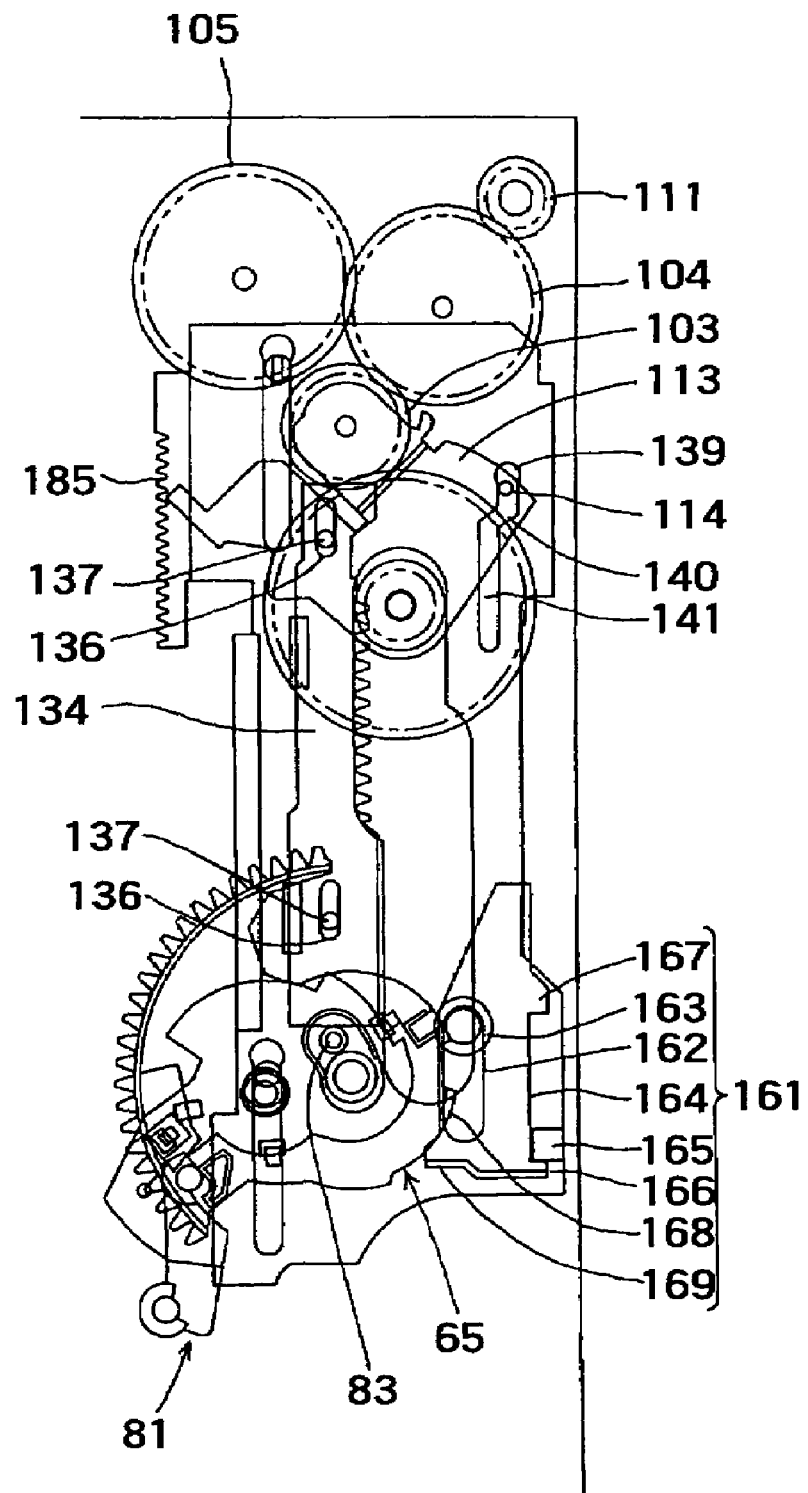
FIG. 23 is a plan view showing the manner in which the gear switching mechanism operates.

When the disk is inserted from the disk slot 3 into the housing 2, the disk transfer mechanism 91 is switched on and transfers the disk into the housing 2. Then, the leading end portion of the disk pushes and turns the disk centering member 81. As shown in FIG. 23, the operating member 83 on the overhanging tongue 89 of the disk centering member 81 presses the rack 134. When pressed, the rack 134 is triggered to bring the gear 133 into mesh with the pinion gear 132 integral with the fourteenth gear 102 of the disk transfer mechanism 91. The rack 134 slides upon rotation of the pinion gear 132.

Figure 24:
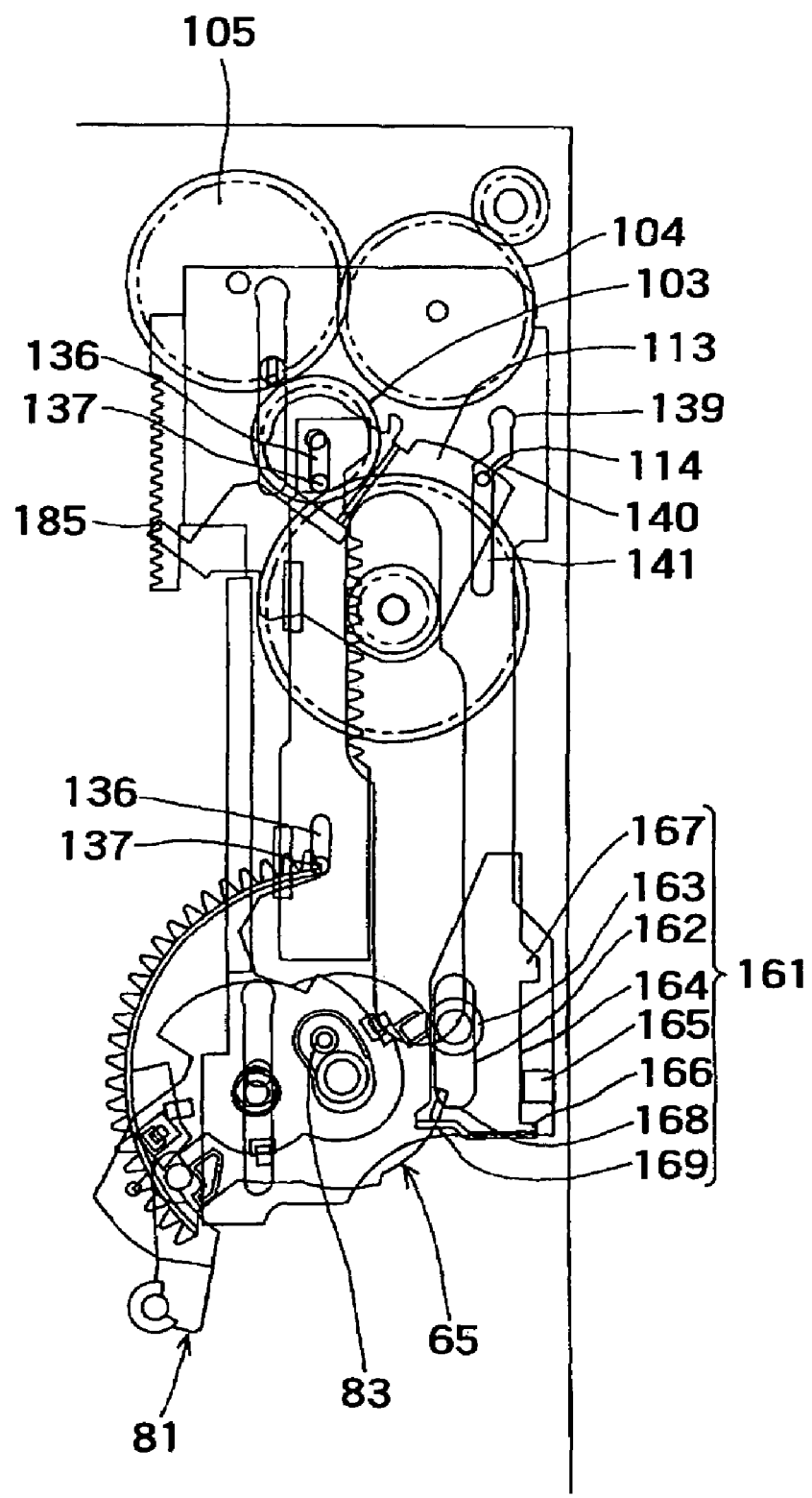
FIG. 24 is a plan view showing the manner in which the gear switching mechanism operates.

When the rack 134 slides a predetermined distance, as shown in FIG. 24, the pin 137 abuts against an end of the slot 136. The gear switching member 135 slides in unison with the rack 134. When the gear switching member 135 slides a predetermined distance, the boss 114 on the gear support member 113 moves from the first groove 139 through the second groove 140 into the third groove 141.

When the boss 114 on the gear support member 113 moves through the second groove 140 into the third groove 141, the gear support member 113 is turned about the shaft 112 to bring the swing gear 103 as the fifteenth gear out of mesh with the sixteenth gear 104. Therefore, the rotation transmission assembly 93 of the disk transfer mechanism 91 is disconnected to prevent the first roller 32 and the second roller 33 from being rotated by the motor 92. While the boss 114 is moving in the third groove 141, the mechanical chassis 11 is lifted and lowered.

(9) The arrangement of a mechanical chassis lifting/lowering mechanism

The mechanical chassis lifting/lowering mechanism 151 operates to lift the mechanical chassis 11 toward the disk that has been positioned substantially directly above the disk table 12 by the disk centering member 81. The mechanism 151 operates to chuck the disk on the disk table 12 mounted on the mechanical chassis 11. After information is recorded on and/or reproduced from the disk, the mechanical chassis lifting/lowering mechanism 151 operates to lower the mechanical chassis 11 and unchuck the disk, which can be ejected.

Figure 26:
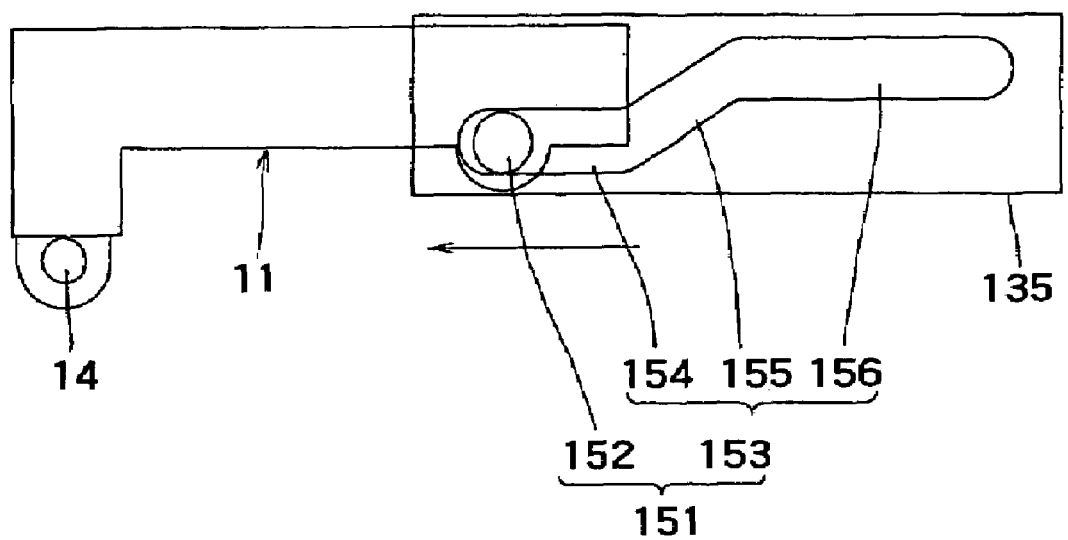
FIG. 26 is a side elevational view of a disk lifting/lowering mechanism in a disk unchucking position.

As shown in FIG. 26, the mechanical chassis lifting/lowering mechanism 151 has an cam engaging knob 152 mounted on a free end of the mechanical chassis 11 whose other end is angularly movably mounted on the base plate 4 by the pivot shaft 14. The cam engaging knob 152 engages with a cam groove 153 provided in a side panel of the gear switching member 135 for lifting and lowering the mechanical chassis 11.

The cam groove 153 has a first cam groove 154, a second cam groove 155, and a third cam groove 156. The first cam groove 154 holds the mechanical chassis 11 in a lowered position (disk unchucking position). The second cam groove 155 is contiguous to an end of the first cam groove 154 for lifting the mechanical chassis 11 from the lowered position. The third cam groove 156 is contiguous to an end of the second cam groove 155 for holding the mechanical chassis 11 in a lifted position (disk chucking position).

Before the disk is inserted from the disk slot 3 into the housing 2, the cam engaging knob 152 on the mechanical chassis 11 is positioned in the first cam groove 154. The mechanical chassis 11 is held in the lowered position (disk unchucking position), as shown in FIG. 26.

Figure 27:
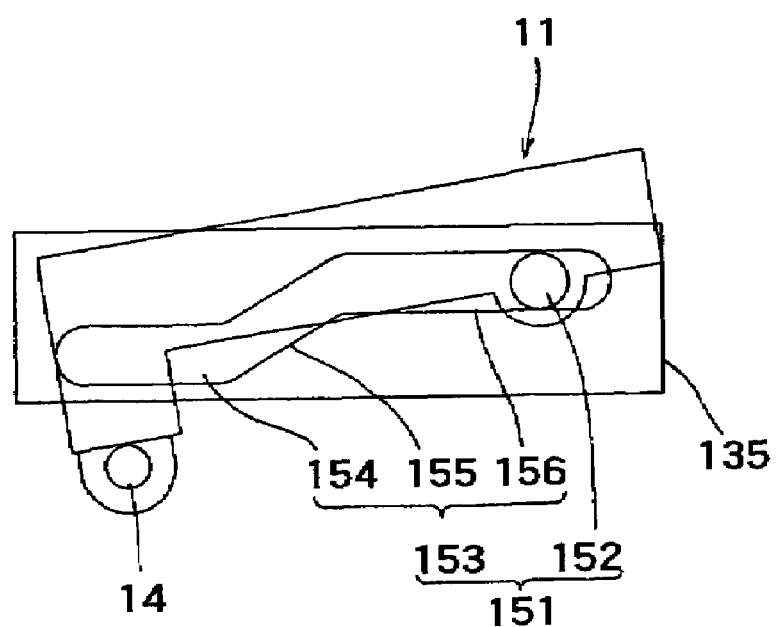
FIG. 27 is a side elevational view of the disk lifting/lowering mechanism in a disk chucking position.

When the disk is inserted from the disk slot 3 into the housing 2, the disk transfer mechanism 91 is switched on. The gear switching member 135 slides a predetermined distance in unison with the rack 134. At that time, as shown in FIG. 27, the cam engaging knob 152 on the mechanical chassis 11 moves from the first cam groove 154 through the second cam groove 155 into the third cam groove 156. The mechanical chassis 11 is held in the lifted position (disk chucking position).

(10) The arrangement of a transfer roller contacting/releasing mechanism

The transfer roller contacting/releasing mechanism 161 serves to displace the transfer rollers 32 and 33 from the disk to make the disk free to rotate after the disk is chucked. Then, information is recorded on and/or reproduced from the disk. For ejecting the disk, the transfer roller contacting/releasing mechanism 161 serves to bring the transfer rollers 32 and 33 into contact with the disk.

As shown in FIG. 22, the transfer roller contacting/releasing mechanism 161 includes a rotary cam operator 164, first and second protrusion engaging ridges 166 and 167, and a roller contacting/releasing tooth 168. The rotary cam operator is mounted on an end of the gear switching member 135 for sliding movement allowed by an oblong hole 162 and a pin 163 within the range of the length of the oblong hole 162. The first and second protrusion engaging ridges 166 are 167 are disposed on the rotary cam operator 164 for engaging a protrusion 165 on the gear switching member 135. The roller contacting/releasing tooth 168 is mounted on the rotary cam 65 of the switch mechanism 61.

Figure 25:
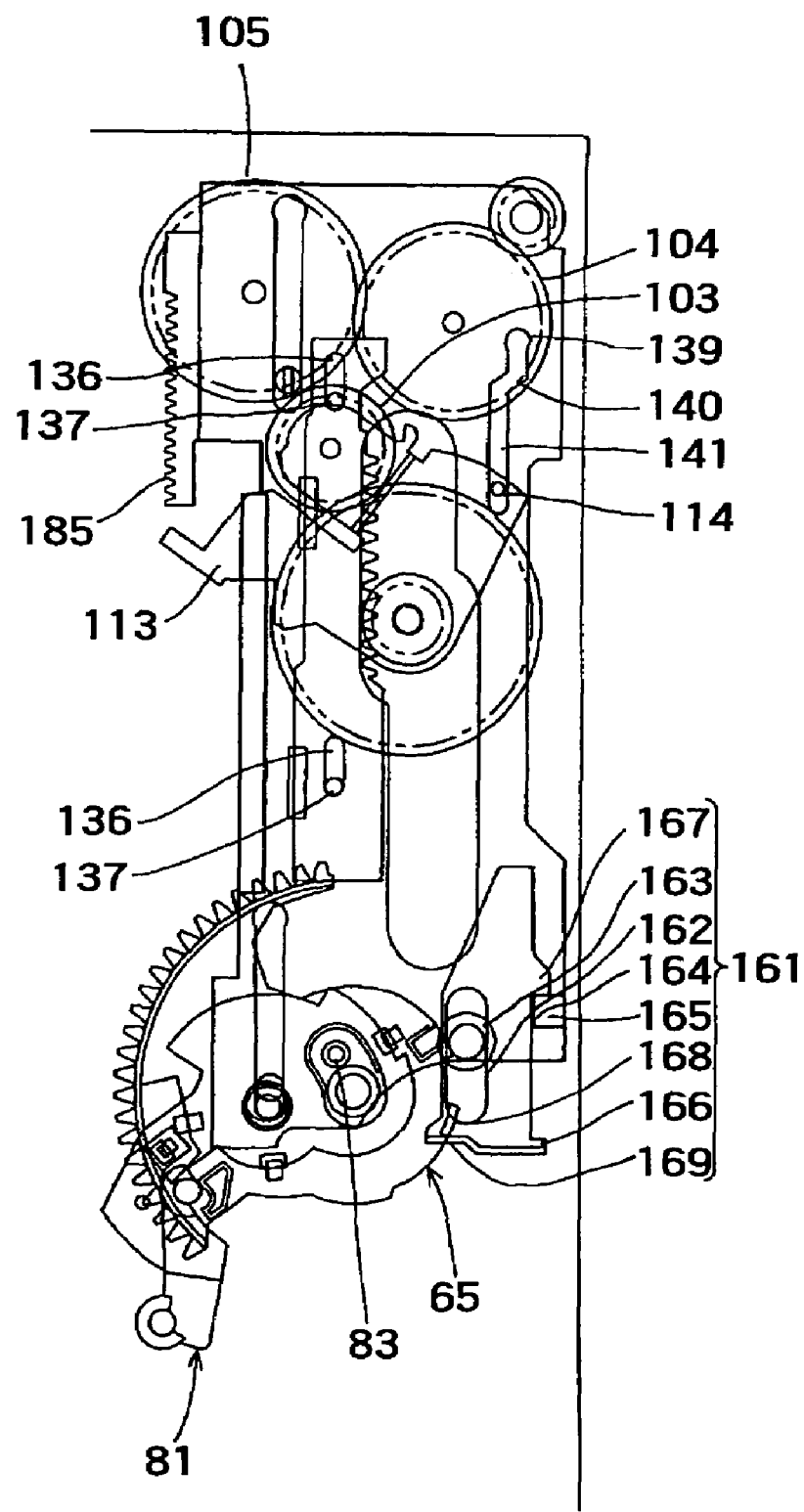
FIG. 25 is a plan view showing the manner in which the gear switching mechanism operates.
Figure 28:
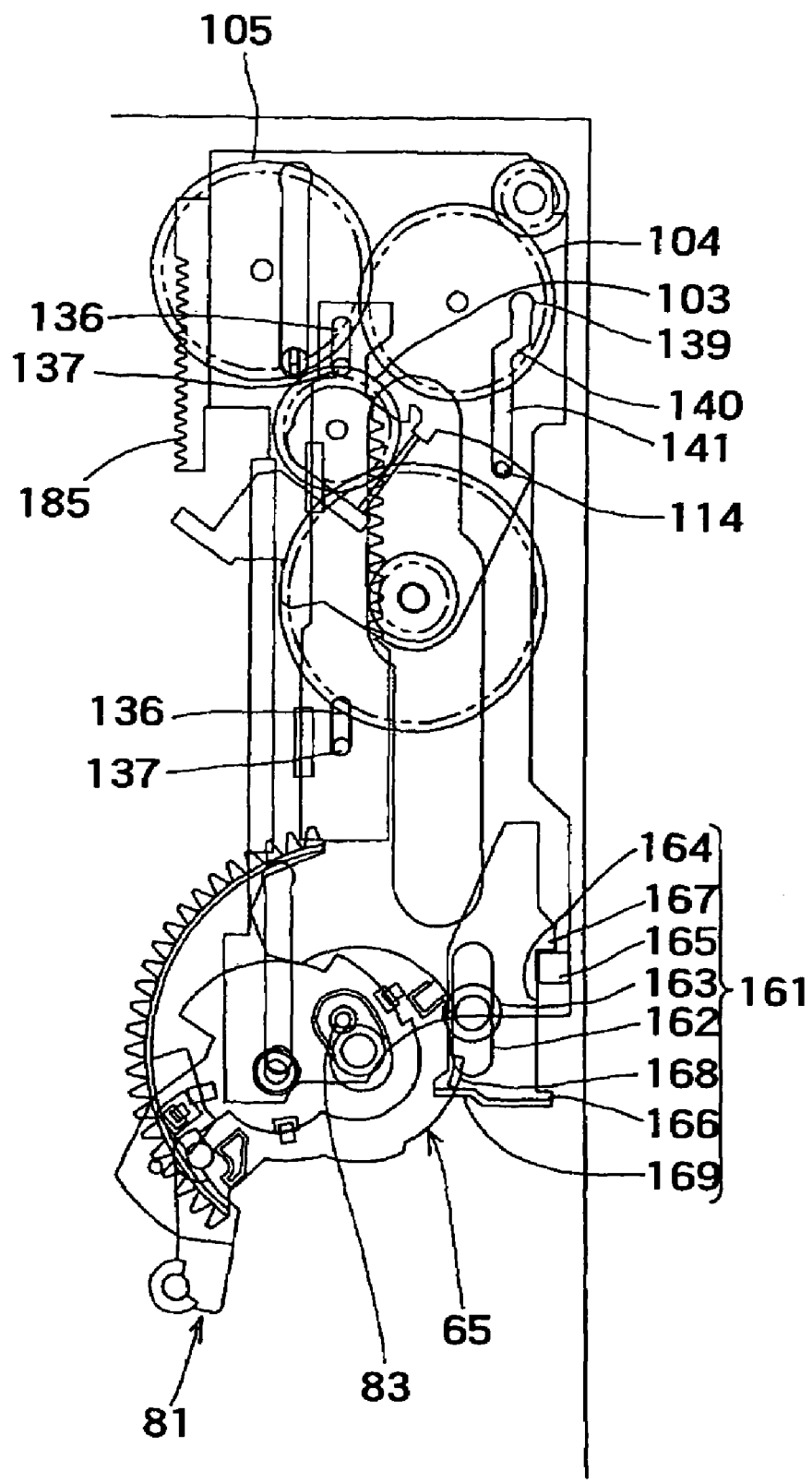
FIG. 28 is a plan view showing the manner in which a disk contacting/releasing mechanism operates.

As shown in FIG. 25, after the disk is chucked, when the gear switching member 135 is continuously moved, the protrusion 165 engages with the second protrusion engaging ridge 167 and causes the rotary cam operator 164 to slide, as shown in FIG. 28. When the rotary cam operator 164 slides, a tooth engaging ridge 169 mounted on an end of the rotary cam operator 164 engages with the roller contacting/releasing tooth 168 and rotates the rotary cam 65.

When the rotary cam 65 is rotated, the first arm 34 and the second arm 35 are angularly moved away from each other by the synchronous drive gear train 38 of the disk insertion guide mechanism 31. The first arm 34 and the second arm 35 are released from the circumferential edge of the disk. Thus, The disk is free to rotate. The rotary cam operator 164 mounted on the gear switching member 135 is allowed to slide by the oblong hole 162 and the pin 163 in order to keep the rotary cam operator 164 out of interference with the rotary cam 65 after the disk is chucked except when the transfer rollers 32 and 33 are brought into and out of contact with the disk.

(11) The arrangement of a dual disk insertion prevention mechanism

When the disk is already inserted in the housing 2, the dual disk insertion prevention mechanism 171 serves to obstruct the disk slot 3. The obstruction indicates that the disk is already inserted in the housing 2 and prevents another disk from being inserted. The dual disk insertion prevention mechanism 171 is positioned substantially centrally in the disk slot 3.

Figure 29:
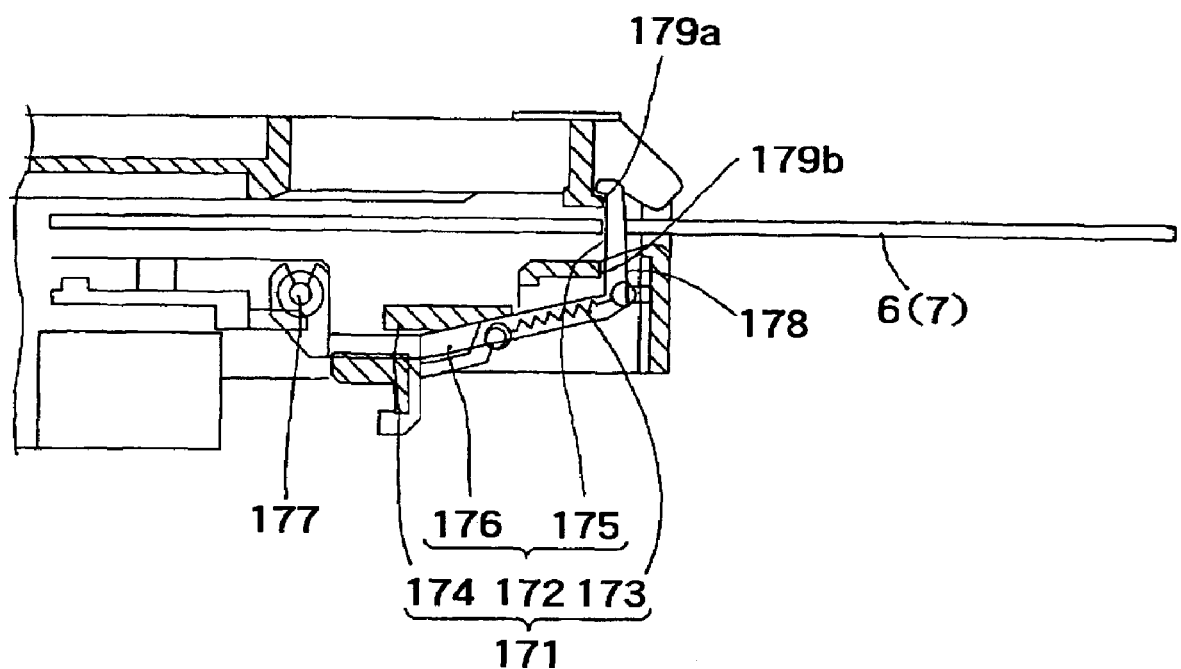
FIG. 29 is a cross-sectional view showing the manner in which a dual disk insertion prevention mechanism obstructs a disk slot.
Figure 30:
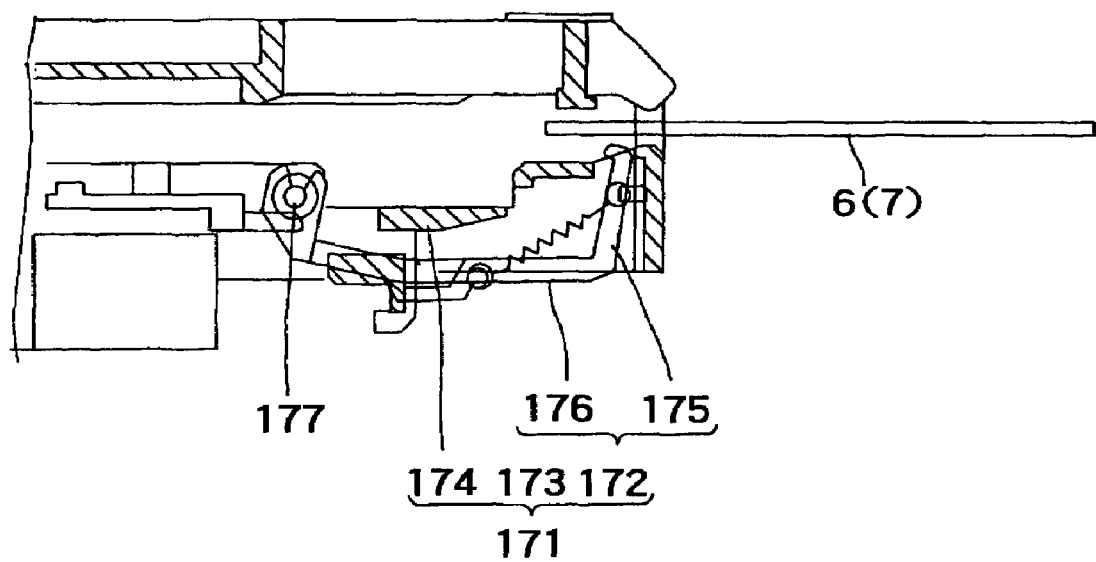
FIG. 30 is a cross-sectional view showing the manner in which the dual disk insertion prevention mechanism opens the disk slot.

As shown in FIGS. 29 and 30, the dual disk insertion prevention mechanism 171 includes a disk insertion prevention member 172, a biasing member 173, and a disk insertion prevention member operating mechanism 174. The disk insertion prevention member closes the disk slot 3. The biasing member 173 biases the disk insertion prevention member 172 toward a position to obstruct the disk slot 3. The disk insertion prevention member operating mechanism 174 moves the disk insertion prevention member 172 from the position to obstruct the disk slot 3 to a position to open the disk slot 3 against the bias of the biasing member 173.

The disk insertion prevention member 172 has a main body 175 and a base 176. The main body 175 is movable into and out of a central area of the disk slot 3. The base 176 has the main body 175 on its distal end. The base 176 is angularly movably mounted on the base plate 4 by a shaft 177. When the base 176 is turned in one direction about the shaft 177, the main body 175 on the distal end of the base 176 enters from a hole 178 provided in the base plate 4 into the disk slot 3. Thus, the central area of the disk slot 3 is obstructed. The disk insertion prevention member 172 is integrally molded of synthetic resin. While the disk insertion prevention member 172 is obstructing the central area of the disk slot 3, when the disk insertion prevention member 172 is pressed by a disk on its way to be inserted into the disk slot 3, the main body 175 has its distal and proximal ends pressed respectively against a receiver 179a on the top panel 5 and a receiver 179b on the base plate 4. The disk from being inserted in addition to the disk already inserted in the housing 2 is prevented.

The biasing member 173 has an end locking the base 176 and an opposite end locking the base plate 4. The biasing member 173 normally biases the disk insertion prevention member 172 to turn counterclockwise about the shaft 177. The main body 175 enters from the hole 178 into the disk slot 3. The biasing member 173 is formed of a coil spring.

Figure 31:
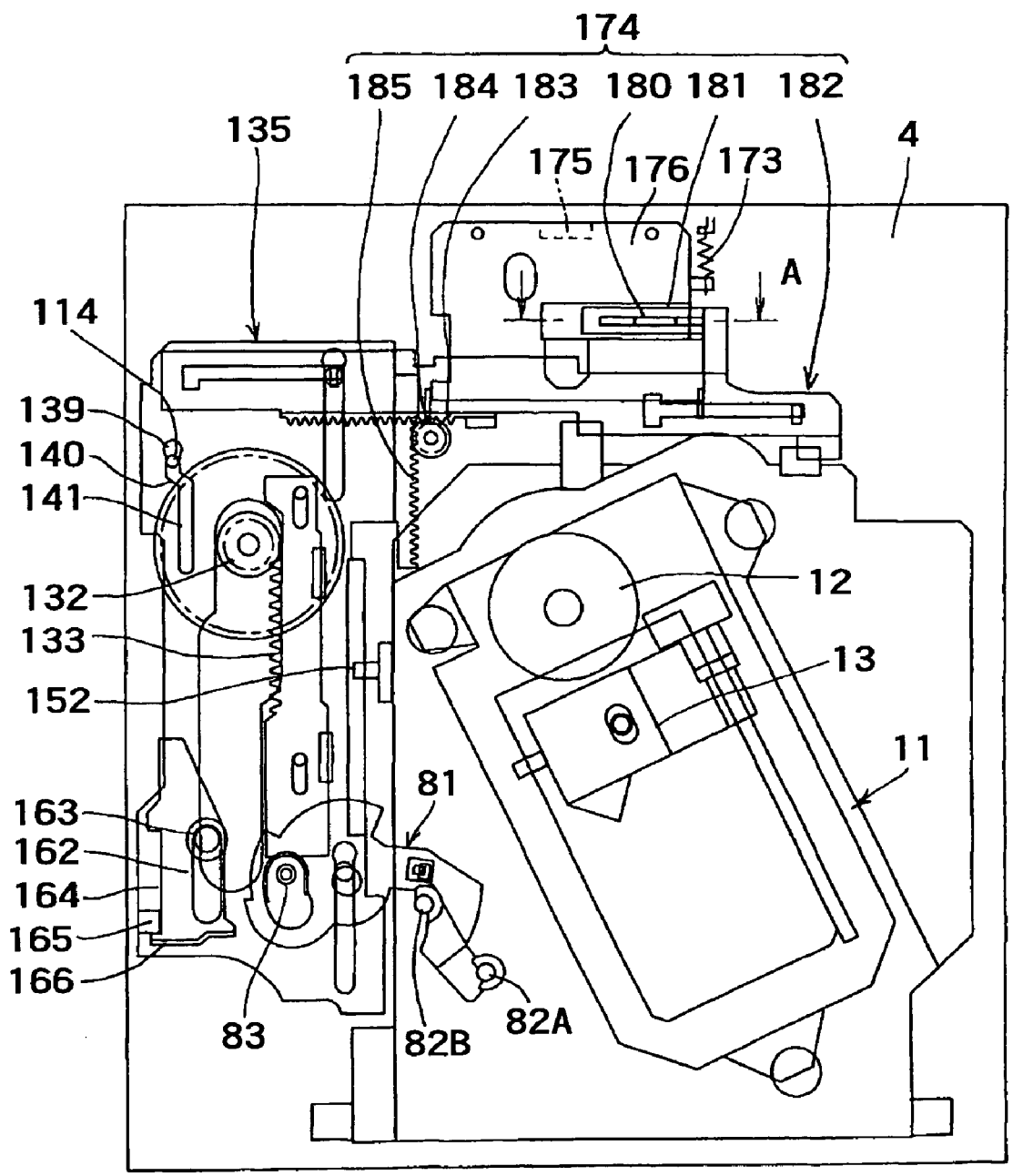
FIG. 31 is a plan view of essential parts of the dual disk insertion prevention mechanism with the disk slot being open.

As shown in FIG. 31, the disk insertion prevention member operating mechanism 174 includes a presser 181, a slider 182, and a pinion 184. The presser 181 has a slender and substantially trapezoidal land 180 for entering between the base 176 and the base plate 4 and pressing the base 176 against the bias of the biasing member 173. The slider 182 is provided with the presser 181 mounted thereon. The pinion 184 is held in mesh with a rack gear 183 on one side of the slider 182. The pinion 184 is also held in mesh with a rack gear 185 on the gear switching member 135.

Figure 32:
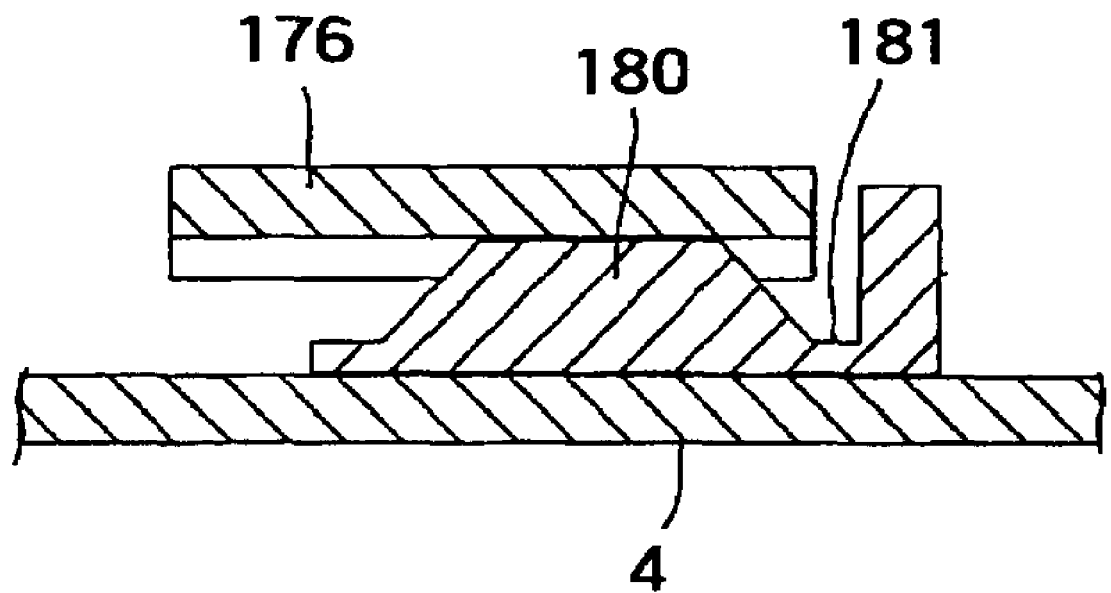
FIG. 32 is a cross-sectional view taken along line A-A of FIG. 31.

Before the disk is inserted from the disk slot 3 into the housing 2, as shown in FIGS. 30 through 32, the trapezoidal land 180 enters between the base 176 and the base plate 4. The base 176 is pressed against the bias of the biasing member 173, and the main body 175 is pulled from the disk slot 3 to open the disk slot 3.

Figure 33:
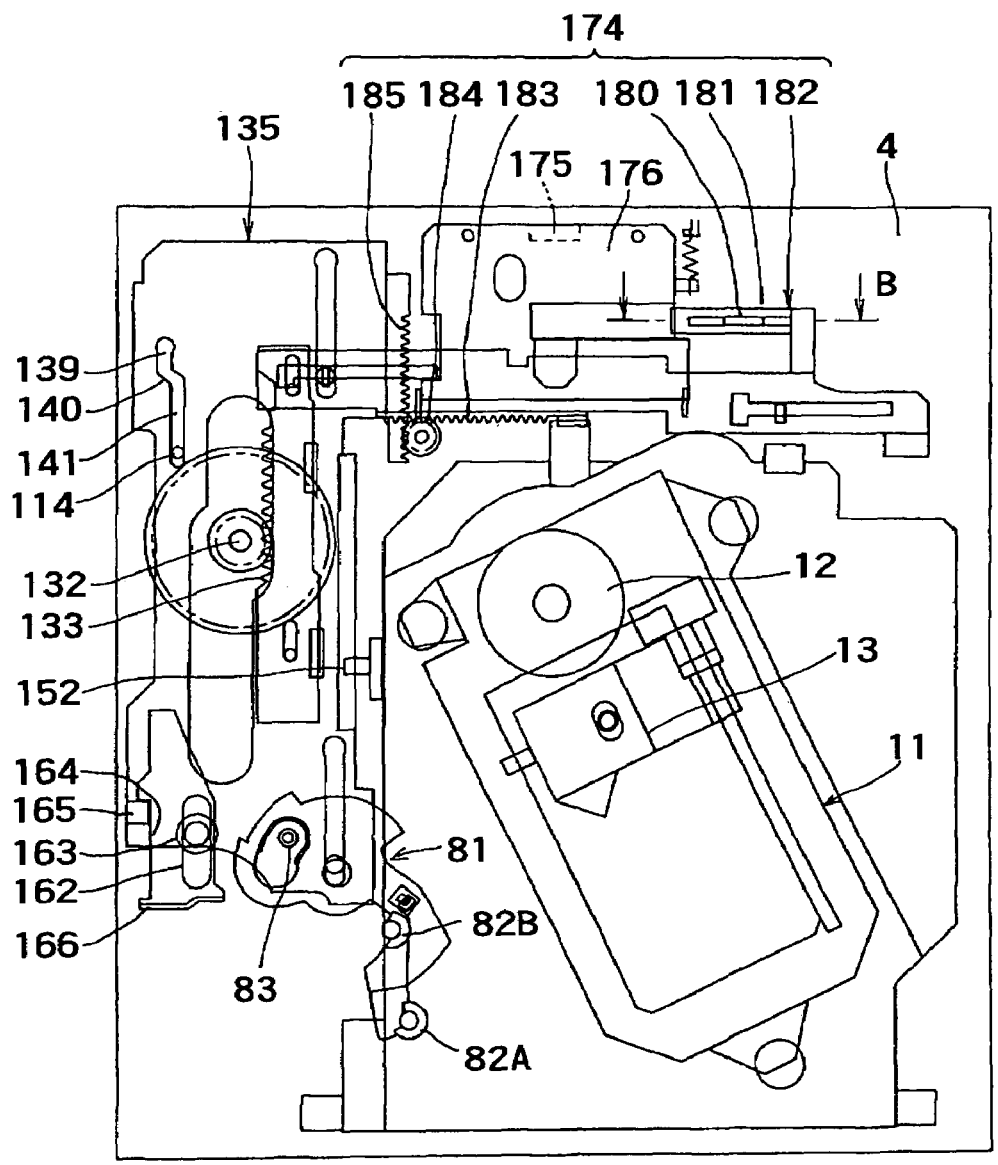
FIG. 33 is a plan view of essential parts of the dual disk insertion prevention mechanism with the disk slot being obstructed.
Figure 34:
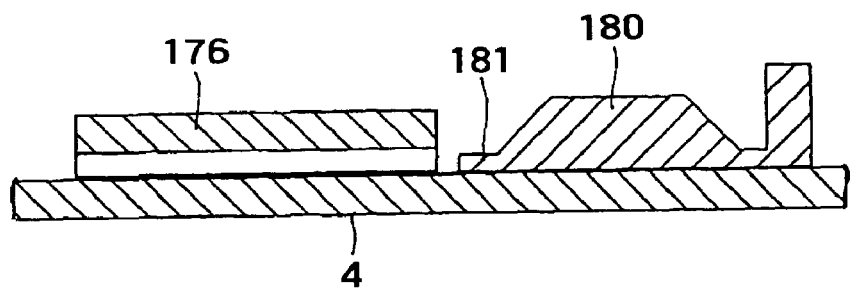
FIG. 34 is a cross-sectional view taken along line B-B of FIG. 33.

When the disk is inserted from the disk slot 3 into the housing 2, the motor 92 is switched on. The disk transfer mechanism 91 transfers the disk. The disk centering member 81 is turned to press the rack 134, which is triggered to cause the gear switching member 135 to slide. The pinion 184 held in mesh with the linear gear 185 on the gear switching member 135 is rotated, and the slider 182 whose rack gear 183 is held in mesh with the pinion 184 slides in ganged relation to the gear switching member 135. The gear switching member 135 slides to a position where the cam groove 153 provided in the side panel of the gear switching member 135 lifts the mechanical chassis 11 to the disk chucking position, as shown in FIGS. 29, 33, and 34. Then, the trapezoidal cam 180 of the presser 181 moves from between the base 176 and the base plate 4, and the presser 181 releases the base 176. Therefore, the base 176 is turned under the bias of the biasing member 176. The main body 176 enters from the hole 178 into the disk slot 3 thereby obstructing the central area of the disk slot 3. In the above embodiment, the main body 175 and the base 176 are molded of synthetic resin. However, the main body 175 may include a metal pin and may be mounted on the base 176 made of synthetic resin.

(12) Operation

Operation of the disk recording and/or reproducing device will be described below with respect to the insertion of an 8-cm disk and the insertion of a 12-cm disk.

The insertion of an 8-cm disk

Figure 37:
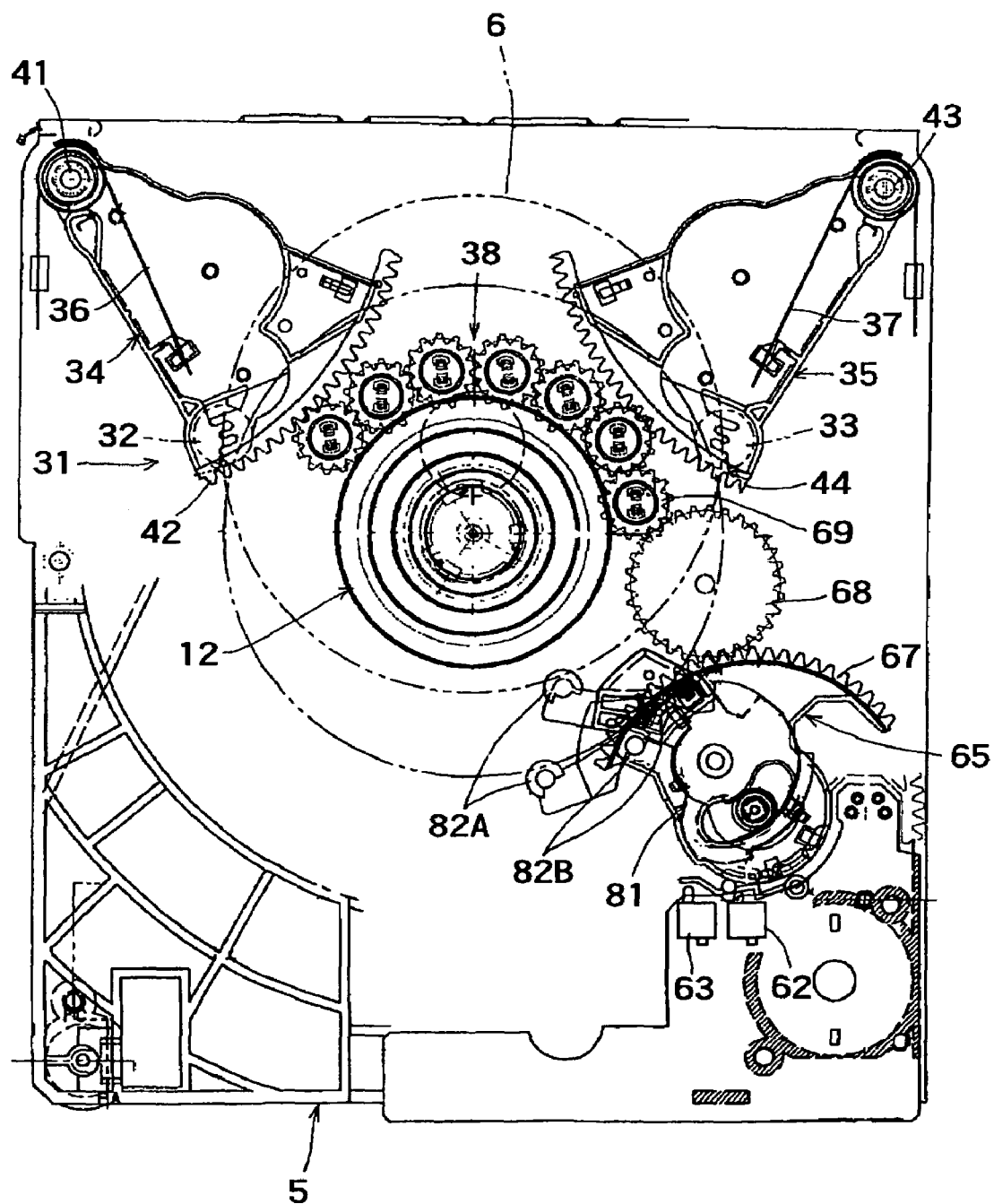
FIG. 37 is a plan view showing the manner in which an 8-mm disk is transferred.

As shown in FIG. 37, when an 8-cm disk 6 is inserted from the disk slot 3, the leading end portion of the 8-cm disk 6 abuts against the circumferential surfaces of the first roller 32 and the second roller 33. When the 8-cm disk 6 is further inserted, the first roller 32 and the second roller 33 are displaced away from each other. The first arm 34 and the second arm 35 turn to spread away from each other. At this time, the first and second rollers 32 and 33 are held in gripping engagement with the circumferential edge of the 8-cm disk 6. As the first arm 34 and the second arm 35 are turned, the interlinking gear train 66 rotates the rotary cam 65 of the switch mechanism 61. The second cam face 72 of the rotary cam 65 turns on the first switch 62. When the first switch 62 is turned on, the motor 92 of the disk transfer mechanism 91 is energized, and the rotation transmission assembly 93 transmits the rotation of the motor 92 to the first roller 32 and the second roller 33.

The rotation of the first roller 32 and the second roller 33 transfers the 8-cm disk 6 into the housing 2. When the 8-cm disk 6 is transferred to a predetermined position and its leading end portion abuts against and presses the first disk abutment 82A, the disk centering member 81 is turned counterclockwise about the shaft 84. When the center of the 8-cm disk 6 moves to a position substantially directly above the disk table 12, the disk centering member 81 is prevented from being further turned by the stopper 85 and positions the 8-cm disk 6.

When the disk centering member 81 is turned, the operating member 83 on the overhanging tongue 89 of the disk centering member 81 presses the rack 134. The rack 134 is triggered to slide in mesh with the small-diameter gear 132 integral with the fourteenth gear 102 of the disk transfer mechanism 91.

As the rack 134 slides a predetermined distance, the pins 137 abut against the respective ends of the slots 136, and the gear switching member 135 slides in unison with the rack 134. As the gear switching member 135 slides a predetermined distance, the boss 114 on the gear support member 113 moves from the first groove 139 through the second groove 140 into the third groove 141.

When the boss 114 on the gear support member 113 moves into the third groove 141, the gear support member 113 is turned about the shaft 112 to bring the fifteenth gear 103 out of mesh with the sixteenth gear 104. Therefore, the rotation transmitting assembly 93 of the disk transfer mechanism 91 is disconnected to prevent the first roller 32 and the second roller 33 from being rotated by the motor 92.

Even when the rotation transmitting assembly 93 of the disk transfer mechanism 91 is disconnected, the rotation of the motor 92 is transmitted to the gear switching member 135 to slide the gear switching member 135. The rotation is transmitted through the first pulley 96, the endless belt 97, the second pulley 98, the eleventh gear 99, the twelfth gear 100, the thirteenth gear 101, the fourteenth gear 102, the small-diameter gear 132, and the rack 134. The endless belt 97 has an end trained around the first pulley 96. The second pulley 98 trains the other end of the endless belt 97. The eleventh gear 99 is mounted on the rotational shaft of the second pulley 98. The twelfth gear 100 is held in mesh with the eleventh gear 99. The thirteenth gear 101 is held in mesh with the twelfth gear 100. The fourteenth gear 102 is held in mesh with the thirteenth gear 101. The small-diameter gear 132 is integral with the fourteenth gear 102.

As the gear switching member 135 slides, the cam engaging knob 152 mounted on the free end of the mechanical chassis 11 is introduced through the second cam groove 155 of the cam groove 153 into the third cam groove 156. The cam groove 155 is provided on the side panel of the gear switching member 135 for lifting and lowering the mechanical chassis 11 to lift the mechanical chassis 11 into the disk chucking position. When the mechanical chassis 11 is lifted into the disk chucking position, a projection (not shown) on the mechanical chassis 11 operates the arm operating member 27 to release the chucking member support arm 23. The chucking member support arm 23 is lowered under the spring force of the torsion coil spring 28 into overlapping relation to the upper surface of the top plate 5. When the mechanical chassis 11 is thus lifted and the chucking member support arm 23 is thus lowered, the 8-cm disk 6 is placed on the disk table 12, and magnetically chucked on the disk table 12 by the chucking member 22 that is magnetically attracted to the disk table 12. The sliding movement of the gear switching member 135 causes the rack gear 185, the pinion 184, and the rack gear 183 to slide the slide member 182. The trapezoidal land 180 of the presser 181 on the slide member 182 is displaced from between the base 176 and the base plate 4 and releases the base 176. The main body 175 now enters from the hole 178 in the base plate 4 into the disk slot 3 under the spring force of the biasing member 173 in the form of a coil spring. The main body 175 obstructs the center area of the disk slot 3. The chucking lock assembly 199 of the mechanical chassis locking mechanism 191 locks the mechanical chassis 11 in the disk chucking position.

After the 8-cm disk 6 is magnetically chucked on the disk table 12, when the gear switching member 135 further slides, as shown in FIG. 28, the tooth engaging ridge 169 engages with the roller contacting/releasing tooth 168 on the rotary cam 65 and rotates the rotary cam 65. The tooth engaging ridge 169 is mounted on the end of the rotary cam operator 164 installed on the gear switching member 135

Figure 38:
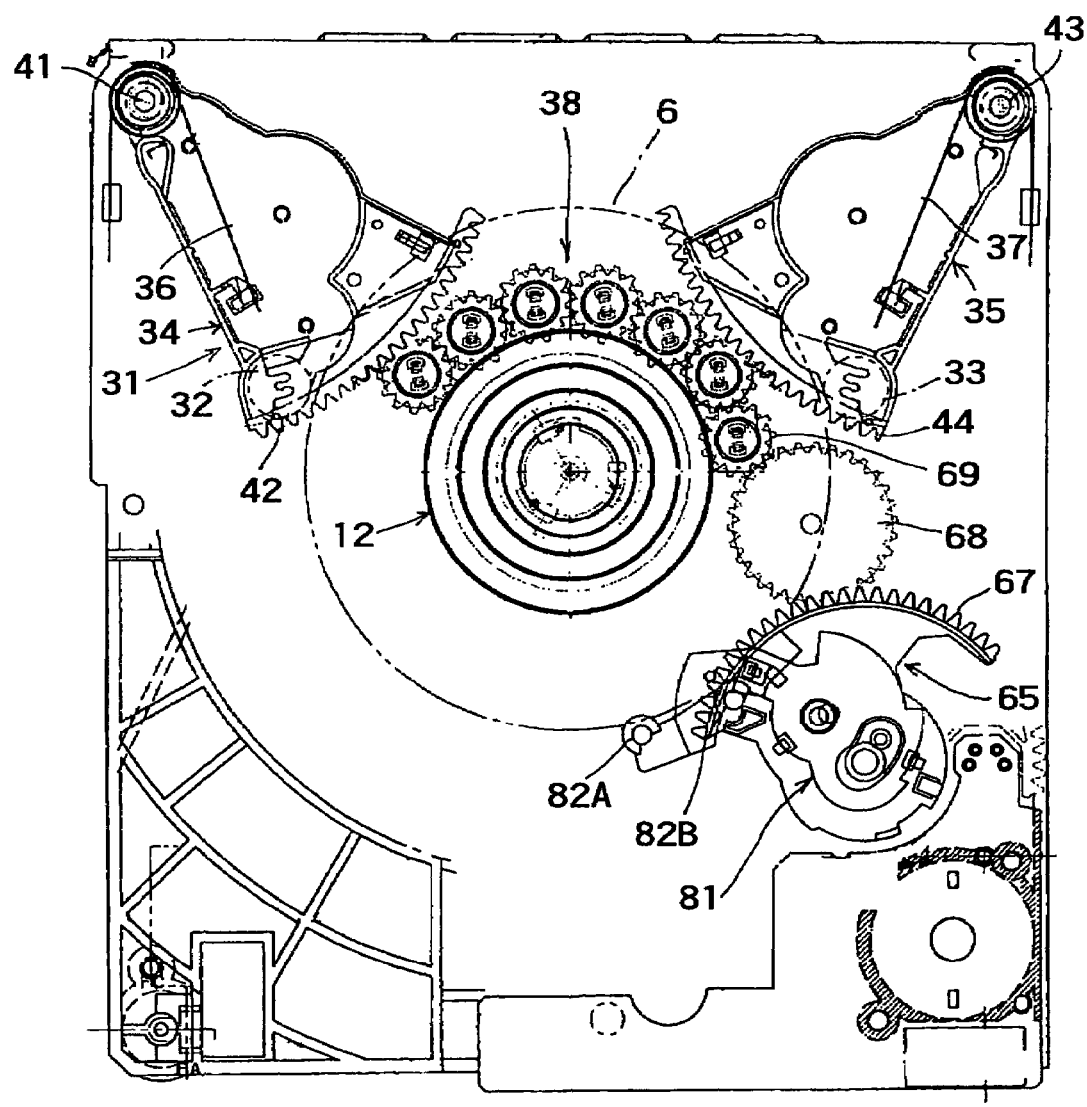
FIG. 38 is a plan view showing the manner in which transfer rollers are released from the disk.

The rotation of the rotary cam 65 causes the synchronous drive gear train 38 of the disk insertion guide mechanism 31 to turn the first arm 34 and the second arm 35 away from each other. As shown in FIG. 38, the first arm 34 and the second arm 35 are displaced away from the circumferential edge of the 8-cm disk 6. Thus, the 8-cm disk 9 is free to rotate. Then, information is recorded on and/or reproduced from the 8-cm disk 6.

After information is recorded on and/or reproduced from the 8-cm disk 6, when the operator presses the eject button, the motor 92 is reversed to perform a reversal of the above disk insertion process. The 8-cm disk 6 is discharged into the disk slot 3 side. At the same time, the unchucking lock assembly 192 of the mechanical chassis locking mechanism 191 locks the mechanical chassis 11 in the disk unchucking position.

The mechanical chassis 11 is locked by the mechanical chassis locking mechanism 191, while the mechanical chassis 11 is in the disk unchucking position. A disk can be inserted into the housing 2 immediately in this state for recording information on and/or reproducing information from the disk. Furthermore, a conventional problem is prevented from occurring in advance. The problem is such that because the operator forgets to move the mechanical chassis 11 to the disk chucking position after the disk is ejected, the mechanical chassis 11 tends to swing in the housing 2 at the time of transferring the disk recording and/or reproducing apparatus.

The mechanical chassis 11 can be locked not only when the mechanical chassis 11 is in the disk unchucking position, but also when the mechanical chassis 11 is in the disk chucking position.

Inasmuch as the first and second locking members 195 and 196 are mounted on the slide member 182, which is slidably disposed in the housing 2, the mechanical chassis 11 can be locked simply by sliding the slide member 182.

Since the mechanical chassis locking mechanism 191 is actuated in ganged relation to the mechanical chassis lifting/lowering mechanism 151, the mechanical chassis 11 can automatically be locked when the mechanical chassis 11 is moved to the disk unchucking position.

After the mechanical chassis 11 is turned into the disk unchucking position, the free end thereof is locked against angular movement by the mechanical chassis locking mechanism 191.

The insertion of a 12-cm disk

Figure 39:
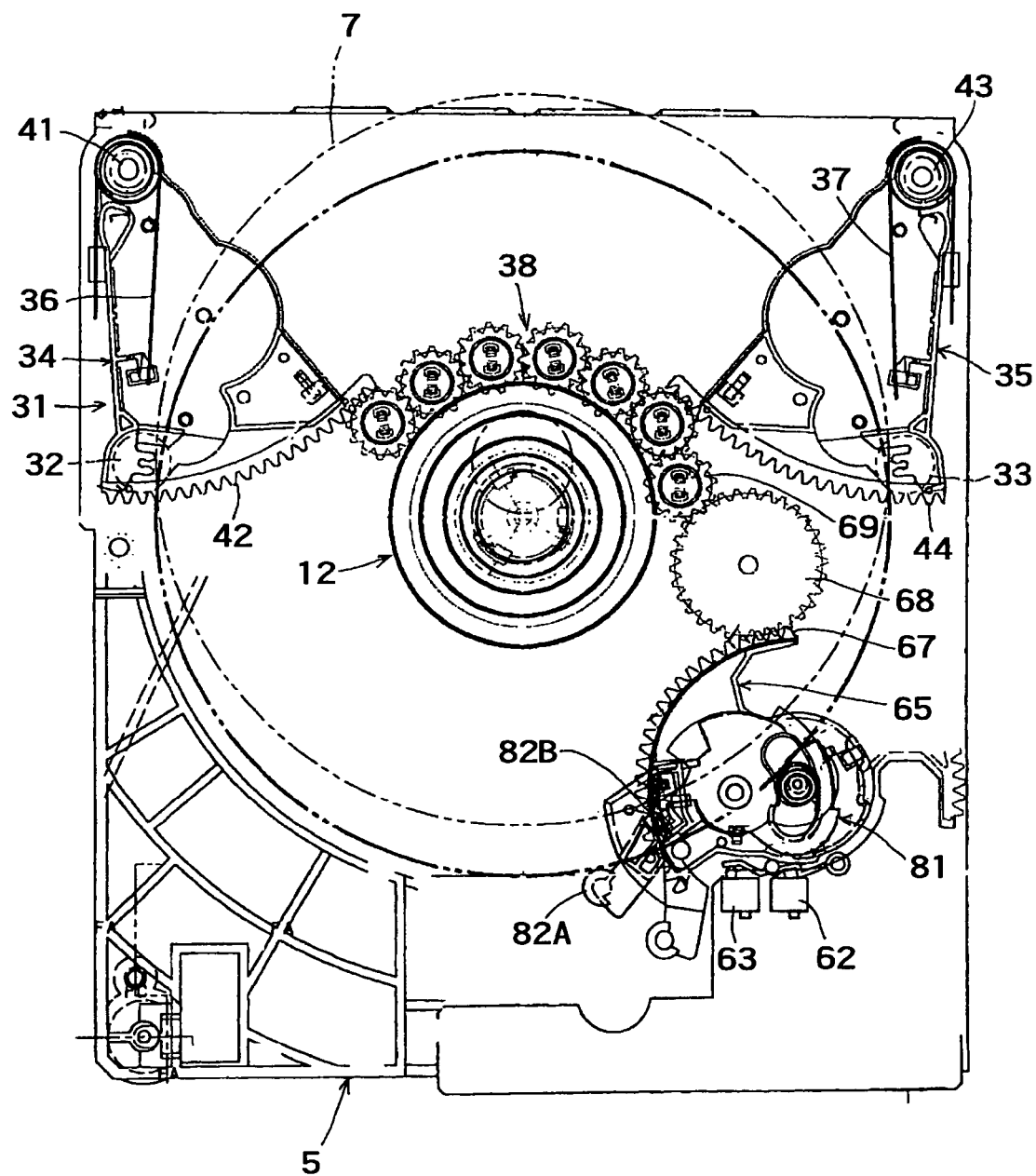
FIG. 39 is a plan view showing the manner in which a 12-mm disk is transferred.

As shown in FIG. 39, when a 12-cm disk 7 is inserted from the disk slot 3 into the housing 2, the leading end portion of the 12-cm disk 7 abuts against the circumferential surfaces of the first roller 32 and the second roller 33. When the 12-cm disk 7 is further inserted, the first roller 32 and the second roller 33 are displaced away from each other. The first and second rollers 32 and 33 angularly move to spread the gap thereof. The angular movement of the first arm 34 causes the interlinking gear train 66 to rotate the rotary cam 65 of the switch mechanism 61. The second cam face 72 of the rotary cam 65 turns on the first switch 62. When the first switch 62 is turned on, the motor 92 of the disk transfer mechanism 91 is energized, and the rotation transmitting assembly 93 transmits the rotation of the motor 92 to the first roller 32 and the second roller 33.

The rotation of the first roller 32 and the second roller 33 transfers the 12-cm disk 7 into the housing 2. The first arm 34 and the second arm 35 angularly move to spread the gap thereof. Since the diameter of the 12-cm disk 7 is greater than the diameter of the 8-cm disk 6 by 4 cm, the first arm 34 and the second arm 35 are turned a greater angular interval than when the 8-cm disk 6 is inserted. Therefore, the rotary cam 65 of the switch mechanism 61 is rotated a greater angular interval than when the 8-cm disk 6 is inserted. The rotary cam 65 thus rotated causes the third cam face 73 thereof to turn on the second switch 63. Inasmuch as both the first switch 62 and the second switch 63 are turned on, the 12-disk 7 is transferred at a higher speed.

When the center of the 12-cm disk 7 moves to a position substantially directly above the disk table 12, the disk centering member 81 is prevented from being further turned by the stopper 85. The 12-cm disk 7 is positioned. For ejecting the 12-cm disk 7, the motor 92 is reversed to perform a reversal of the above disk inserting process. The 12-cm disk 7 is discharged into the disk slot 3.

While a preferred embodiment of the invention has been described using specific terms, such description is for illustrative purposes only, and it is to be understood that changes and variations may be made without departing from the spirit or scope of the following claims.

What is claimed is:

1. A recording and/or reproducing apparatus comprising:
a disk transfer mechanism for transferring a disk onto a disk table with a motor, said disk transfer mechanism having a rotation transmitting assembly having a gear train including a swing gear and another gear;
a mechanical chassis lifting/lowering mechanism for lifting and lowering a mechanical chassis with respect to the disk, which is transferred onto said disk table by said disk transfer mechanism;
a gear switching mechanism for bringing said swing gear out of mesh with said another gear of said gear train after the disk is transferred onto said disk table by said disk transfer mechanism, thereby preventing said disk transfer mechanism from being actuated by said motor, and actuating said mechanical chassis lifting/lowering mechanism with said motor; and
a gear support member angularly movable about a shaft, said swing gear being mounted on said gear support member,
wherein said near support member has a boss engaging in a cam groove.

2. The recording and/or reproducing apparatus according to claim 1, wherein said gear train includes a pinion gear, said gear switching mechanism having a rack capable of meshing with said pinion gear and having a gear switching member slidable by said rack;
said rack having a gear for being pressed and sliding into mesh with said pinion gear, when the disk is transferred onto said disk table by said disk transfer mechanism;
said gear switching member having said cam groove for moving said swing gear between a first position in mesh with said another gear and a second position out of mesh with said another gear.

3. The recording and/or reproducing apparatus according to claim 2, wherein said cam groove comprises a first groove extending in a sliding direction of said gear switching member for holding said swing gear in said first position, a slanted second groove contiguous to an end of said first groove for moving said swing gear from said first position to said second position, and a third groove contiguous to an end of said second groove and extending in the sliding direction of said gear switching member for holding said swing gear in said second position.

4. A recording and/or reproducing apparatus comprising:
a disk insertion guide mechanism having a pair of angularly movable arms supporting respective transfer rollers for contacting an outer circumferential edge of a disk;
a disk transfer mechanism for transferring the disk onto a disk table with a motor, said disk transfer mechanism having a rotation transmitting assembly having a gear train including a swing gear and another gear;
a mechanical chassis lifting/lowering mechanism for lifting and lowering a mechanical chassis with respect to the disk, which is transferred onto said disk table by said disk transfer mechanism; and
a gear switching mechanism for bringing said swing gear out of mesh with said another gear of said gear train after the disk is transferred onto said disk table by said disk transfer mechanism, thereby preventing said disk transfer mechanism from being actuated by said motor, and actuating said mechanical chassis lifting/lowering mechanism with said motor;
said gear switching mechanism having a transfer roller contacting/releasing mechanism actuatable after said mechanical chassis lifting/lowering mechanism is lifted, for displacing the transfer rollers of said disk insertion guide mechanism away from the outer circumferential edge of the disk.

5. A reproducing apparatus comprising:
a motor;
a pinion gear angularly movable by said motor;
a rack capable of meshing with said pinion gear;
a gear switching member slidable by said rack;
a gear support member angularly movable about a shaft corresponding to the slide position of said gear switching member;
a swing gear movable between a first position and a second position corresponding to the angular movement of said gear support member, said swing gear angularly movable by said motor; and
transfer rollers that transfer a disc by the driving force of said motor, said driving force transmitted through another gear capable of meshing with said swing gear;
wherein said swing gear is in mesh with said another gear when said swing gear is in said first position, said swing gear is out of mesh with said another gear when said swing gear is in said second position, and
wherein said gear support member has a boss engaged in a cam groove.

6. The reproducing apparatus according claim 5, wherein said cam groove including a first groove, a slanted second groove, and a third groove,
said first groove extending in the sliding direction of said gear switching member,
said slanted second groove being contiguous to an end of said first groove, and
said third groove being contiguous to an end of said second groove and extending in the sliding direction of said gear switching member.

7. The reproducing apparatus according to claim 5 further comprising:
a disk transfer mechanism for transferring a disk onto a disk table with a motor, said disk transfer mechanism having a rotation transmitting assembly having a gear train including a swing gear and another gear; and
a mechanical chassis lifting/lowering mechanism for lifting and lowering a mechanical chassis with respect to the disk, which is transferred onto said disk table by said disk transfer mechanism.

* * * * *

UNITED STATES PATENT AND TRADEMARK OFFICE
CERTIFICATE OF CORRECTION

| | |
|---|---|
| PATENT NO. | : 7,373,648 B2 |
| APPLICATION NO. | : 10/895804 |
| DATED | : May 13, 2008 |
| INVENTOR(S) | : Kenichi Hirano et al. |

It is certified that error appears in the above-identified patent and that said Letters Patent is hereby corrected as shown below:

In claim 1, column 18, line 17, "near" should read --gear--.

\*In claim 6, column 20, line 1, "according claim" should read --according to claim--.

Signed and Sealed this

Ninth Day of December, 2008

JON W. DUDAS
*Director of the United States Patent and Trademark Office*